(12) United States Patent (10) Patent No.: US 10,767,448 B2
Djikpesse et al. (45) Date of Patent: Sep. 8, 2020

(54) MULTISTAGE OILFIELD DESIGN OPTIMIZATION UNDER UNCERTAINTY

(71) Applicant: Schlumberger Technology Corporation, Sugar Land, TX (US)

(72) Inventors: Hugues A. Djikpesse, Cambridge, MA (US); Kashif Rashid, Wayland, MA (US); William J. Bailey, Cambridge, MA (US); Michael David Prange, Somerville, MA (US); Benoit Couet, Belmont, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1009 days.

(21) Appl. No.: 15/109,671

(22) PCT Filed: Jan. 6, 2015

(86) PCT No.: PCT/US2015/010242
§ 371 (c)(1),
(2) Date: Jul. 5, 2016

(87) PCT Pub. No.: WO2015/103582
PCT Pub. Date: Jul. 9, 2015

(65) Prior Publication Data
US 2016/0326845 A1 Nov. 10, 2016

Related U.S. Application Data

(60) Provisional application No. 61/924,063, filed on Jan. 6, 2014, provisional application No. 62/069,187, filed
(Continued)

(51) Int. Cl.
*G06G 7/48* (2006.01)
*E21B 41/00* (2006.01)
(Continued)

(52) U.S. Cl.
CPC .......... *E21B 41/0092* (2013.01); *E21B 43/00* (2013.01); *E21B 43/26* (2013.01);
(Continued)

(58) Field of Classification Search
CPC .... E21B 41/0092; E21B 43/00; E21B 43/267; E21B 49/00; E21B 47/00; G05B 13/041;
(Continued)

(56) References Cited

U.S. PATENT DOCUMENTS 6,434,435 B1 8/2002 Tubel et al.
6,775,578 B2 8/2004 Couet et al.
(Continued)

FOREIGN PATENT DOCUMENTS

| RU | 2211311 C2 | 8/2003 |
|---|---|---|
| RU | 2413992 C2 | 6/2009 |
| WO | 2012125558 A2 | 9/2012 |

OTHER PUBLICATIONS

Decision on Grant issued in Russian Patent Appl. No. 2016132217 dated Aug. 7, 2018; 21 pages (with English translation).
(Continued)

*Primary Examiner* — Andre Pierre Louis
(74) *Attorney, Agent, or Firm* — Cathy Hewitt

(57) ABSTRACT

Managing oilfield operations include obtaining a subsurface model including a fracture design model having an fracture property with an uncertain value. A set of representative values that represent uncertainty in the fracture property is obtained and used to solve an oilfield optimization problem with a control variable to obtain a solution. The solution includes an optimal value for the control variable. Based on the solution, an oilfield design is generated and stored.

20 Claims, 19 Drawing Sheets

Related U.S. Application Data on Oct. 27, 2014, provisional application No. 62/069,194, filed on Oct. 27, 2014, provisional application No. 62/069,189, filed on Oct. 27, 2014, provisional application No. 62/069,178, filed on Oct. 27, 2014.

(51) Int. Cl.

| | | |
|---|---|---|
| *E21B 43/00* | (2006.01) | |
| *G06Q 10/06* | (2012.01) | |
| *G06F 30/20* | (2020.01) | |
| *E21B 43/26* | (2006.01) | |
| *E21B 43/267* | (2006.01) | |
| *E21B 47/00* | (2012.01) | |
| *E21B 49/00* | (2006.01) | |
| *G05B 13/04* | (2006.01) | |
| *G06Q 50/02* | (2012.01) | |
| G06G 7/50 | (2006.01) | |
| G06N 3/04 | (2006.01) | |
| H04W 16/12 | (2009.01) | |
| G06F 30/00 | (2020.01) | |
| G06F 111/06 | (2020.01) | |

(52) U.S. Cl.
CPC ............ *E21B 43/267* (2013.01); *E21B 47/00* (2013.01); *E21B 49/00* (2013.01); *G05B 13/041* (2013.01); *G06F 30/20* (2020.01); *G06Q 10/06316* (2013.01); *G06Q 50/02* (2013.01); *G06F 30/00* (2020.01); *G06F 2111/06* (2020.01); *G06N 3/04* (2013.01); *H04W 16/12* (2013.01)

(58) Field of Classification Search
CPC .......... G06F 17/5009; G06Q 10/06316; G06Q 50/02
USPC ..................................................... 703/9, 10
See application file for complete search history.

(56) References Cited

U.S. PATENT DOCUMENTS

| | | | |
|---|---|---|---|
| 6,980,940 | B1 | 12/2005 | Gurpinar et al. |
| 8,600,717 | B2 | 12/2013 | Rashid et al. |
| 9,250,346 | B2 | 2/2016 | Charara et al. |
| 2007/0294034 | A1* | 12/2007 | Bratton .................. E21B 41/00 702/6 |
| 2008/0133194 | A1 | 6/2008 | Klumpen et al. |
| 2008/0172272 | A1 | 7/2008 | Back et al. |
| 2008/0289875 | A1 | 11/2008 | Burge et al. |
| 2008/0294344 | A1 | 11/2008 | Sugiura |
| 2008/0319726 | A1* | 12/2008 | Berge .................. E21B 41/0064 703/10 |
| 2009/0132979 | A1 | 5/2009 | Naters et al. |
| 2010/0027377 | A1 | 2/2010 | Zuercher |
| 2010/0088082 | A1 | 4/2010 | Ingham et al. |
| 2011/0119037 | A1 | 5/2011 | Rashid et al. |
| 2011/0238392 | A1 | 9/2011 | Carvallo et al. |
| 2012/0095603 | A1 | 4/2012 | Rashid et al. |
| 2012/0130696 | A1 | 5/2012 | Davidson et al. |
| 2012/0203525 | A1 | 8/2012 | Rodriguez Herrera et al. |
| 2013/0064188 | A1 | 3/2013 | Tseng et al. |
| 2013/0246032 | A1 | 9/2013 | El-Bakry et al. |
| 2014/0094974 | A1 | 4/2014 | Rashid |
| 2015/0081200 | A1 | 3/2015 | Wang et al. |
| 2015/0088795 | A1 | 3/2015 | Golovashkin et al. |
| 2015/0205759 | A1 | 7/2015 | Israel et al. |
| 2015/0226049 | A1 | 8/2015 | Frangos et al. |
| 2015/0268365 | A1 | 9/2015 | Djikpesse et al. |
| 2015/0331122 | A1 | 11/2015 | Prange et al. |
| 2016/0281497 | A1 | 9/2016 | Tilke et al. |
| 2016/0305237 | A1 | 10/2016 | Klemin et al. |
| 2016/0326845 | A1 | 11/2016 | Djikpesse et al. |
| 2017/0032532 | A1 | 2/2017 | Andersen et al. |
| 2017/0336811 | A1 | 11/2017 | Stone et al. |

OTHER PUBLICATIONS

Rashid et al., "A comparison of adaptive network proxy methods for expensive nonlinear constrained optimization", J. Modeling and Simulation, vol. 4, pp. 25-32, Jun. 2013.

Non-Final Office Action issued in U.S. Appl. No. 15/109,681 dated Sep. 21, 2018; 9 pages.

Ahmed et al., "Development of low permeability reservoir utilizing multi-stage fracture completion in the minimum stress direction", SPE Conference Paper, SPE 160848-MS, Apr. 8-11, 2012, 8 pages.

Bailey et al., "Framework for Field Optimization to Maximize Asset Value", SPE Reservoir Evaluation & Engineering, SPE 87026-PA, 2005, vol. 8, pp. 7-21.

Barahona et al., "Experiments in quadratic 0-1 programming", Mathmatical Programming, 1989, vol. 44, pp. 127-137.

Beasley et al., "Heuristic algorithms for the unconstrained binary quadratic programming problem", The Management School, Imperial College, London, December, Dec. 1998, 36 pages.

Bonami et al., "An algorithmic framework for convex mixed integer nonlinear programs", J. Discrete Optimization, 2008, vol. 5, No. 2, pp. 186-204.

Eisner et al., "Uncertainties in passive seismic monitoring", The Leading Edge, 2009, vol. 28, pp. 648-655.

Gilbert, "Gray codes and paths on the n-cube", The Bell System Technical Jounal, May 1958, pp. 815-826.

Grieser et al., "Predicting production outcome from multi-stage, horizontal Barnett completions", SPE Conference Paper SPE 120271-MS, Apr. 4-8, 2009, 10 pages.

International Search Report and Written Opinion issued in International Patent Application No. PCT/US2015/010216 dated Mar. 30, 2015; 10 pages.

International Search Report and Written Opinion issued in International Patent Application No. PCT/US2015/010242 dated Apr. 27, 2015; 12 pages.

Jones et al., "Locating microseismic events using borehole data", Geophysical Prospecting, 2014, vol. 62, pbs. 34-49.

Wigger et al., "Logging solutions for Completion Optimization in Unconventional Resource Plays", SPE Conference Paper SPE 167726-MS, Feb. 25-27, 2014, 17 pages.

Lomax et al., "Earthquake Location, Direct, Global-Search Methods", in Encyclopedia of Complexity and System Science, Part 5, Meyers, R.A. (ed.), Springer, New York, 2009, pp. 2449-2473.

Miller et al., "Evaluation of Production Log Data from Horizontal Wells Drilled in Organic Shales", SPE Conference Paper, SPE 144326-MS, Jun. 14-16, 2011, 23 pages.

Molga et al., "Test Functions for Optimization Needs", Manuscrip at http://www.zsd.ict.pwr.wroc.pl/files/docks/functions.pdf, Apr. 2005, 43 pages.

Rashid et al., "An Efficient Procedure for expensive Reservoir Simulation Optimization under Uncertainty", SPE Economics and Management, SPE 167261-PA, 2013, vol. 5, pp. 21-33.

Slocombe et al., "Eagle Ford Completion Optimization Using Horizontal Log Data", SPE Conference Paper, SPE 166242-MS, Sep. 30-Oct. 2, 2013, 6 pages.

Storn et al., "Differential evolution: A simple and efficient heuristic for global optimization over continuous spaces", J. Global Optimization, Dec. 1997, vol. 11, No. 4, pp. 341-359.

Thomsen, "Weak elastic anisotropy", Geophysics, 1986, vol. 51, pp. 1954-1966.

Wiegele, "Binary quadratic and max cut library", http://biqmac.uni-klu.ac.at//biqmaclib.html, 2007, 4 pages.

Benoist et al., "Localsolver 1.X: a black-box local-search solver for 01 programming", 40R, A Quarterly Journal of Operations Research, vol. 9, No. 3, pp. 299-316, 2011.

Djikpesse et al., "A practical sequential lexicographic approach for derivative-free black-box constrained Optimization", J. Engineering Optimization, Jul. 2011, vol. 43, No. 7, pp. 721-739.

Gei et al., "Feasibility of Estimation of Vertical Transverse Isotropy from Microseismic Data Recorded by Surface Monitoring Arrays", Geophysics, 2011, vol. 76, WC117-WC126.

(56) References Cited

OTHER PUBLICATIONS

Mills et al., "Some complete cycles on the n-cube", Proceedings of the American Mathematical Society, Aug. 1963, vol. 14, No. 4, pp. 640-643.
Rahman et al., "An integrated model for multiojective design optimization of hydraulic fracturing", Journal of Petroleum Science and Engineering, 2001, vol. 31, Issue 1, pp. 41-62.
Rashid et al., "An adaptive multiquadric radial basis function method for expansive black-box mixed integer nonlinear constrained optimization", J. Engineering Optimization, Feb. 2013, vol. 45, No. 2, pp. 185-206.
Seher et al., "Tube wave to shear wave conversion at borehole plugs", Geophysical Prospecting, Feb. 21, 2014, vol. 62, pp. 540-551.
Office Action issued in Russian Patent Application No. 2016132217 dated Jun. 5, 2017; 15 pages.
Office Action issued in Chinese Patent Appl. No. 201580012350.2 dated Oct. 26, 2018; 7 pages (with English translation).

\* cited by examiner

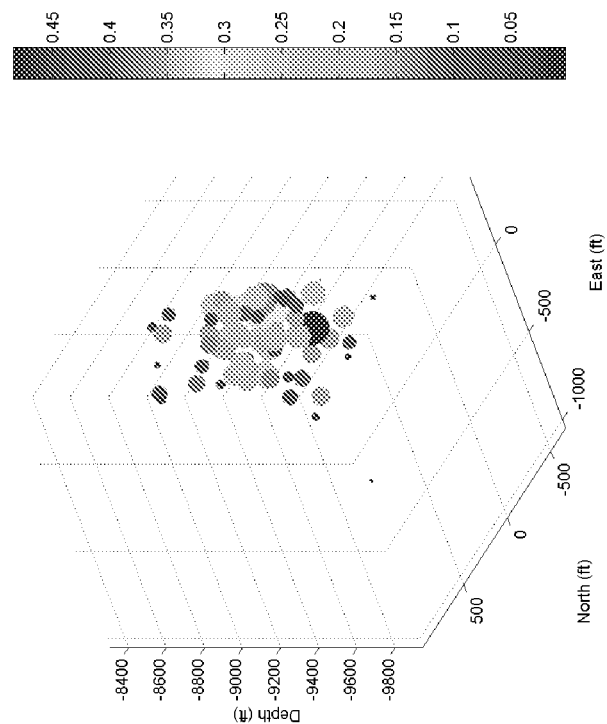
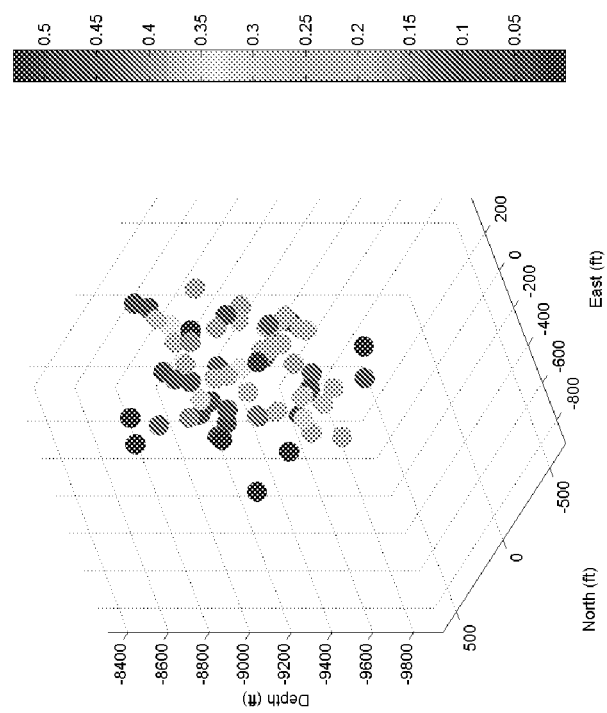
FIG. 7

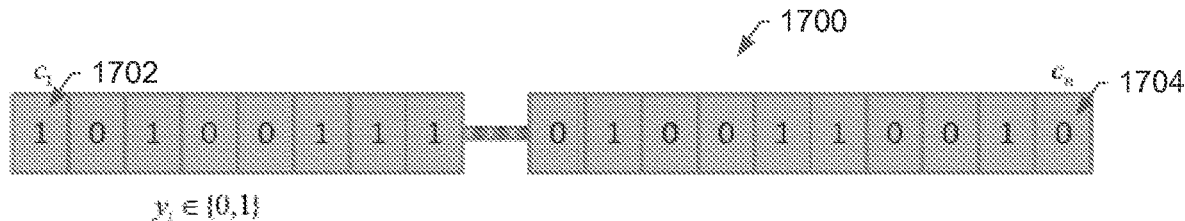
Binary Optimization Problem Schema
*FIG. 17*
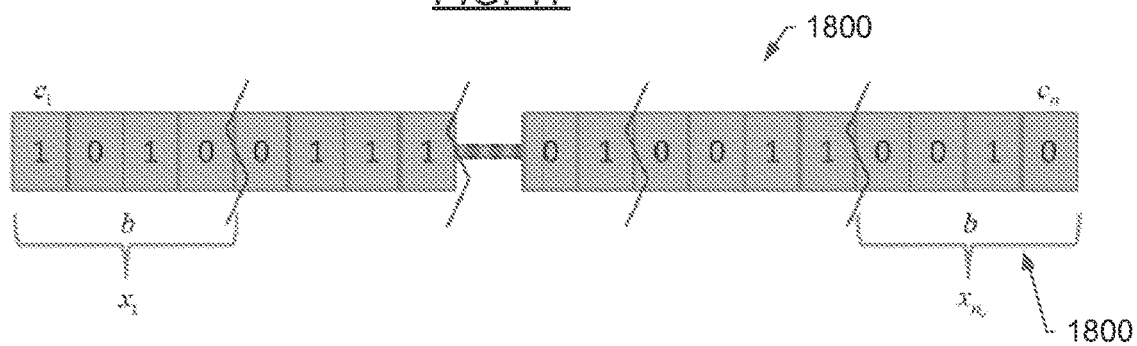
Binary Abstraction Method Schema
*FIG. 18*
Table 1: Binary and Gray Transforms
| Code | Binary | | | | Gray | | | |
|---|---|---|---|---|---|---|---|---|
| Index | $v_j$ | | | | $v_j$ | | | |
| $x_j$ | $y_1$ | $y_2$ | $y_3$ | $y_4$ | $y_1$ | $y_2$ | $y_3$ | $y_4$ |
| 0 | 0 | 0 | 0 | 0 | 0 | 0 | 0 | 0 |
| 1 | 0 | 0 | 0 | 1 | 0 | 0 | 0 | 1 |
| 2 | 0 | 0 | 1 | 0 | 0 | 0 | 1 | 1 |
| 3 | 0 | 0 | 1 | 1 | 0 | 0 | 1 | 0 |
| 4 | 0 | 1 | 0 | 0 | 0 | 1 | 1 | 0 |
| 5 | 0 | 1 | 0 | 1 | 0 | 1 | 1 | 1 |
| 6 | 0 | 1 | 1 | 0 | 0 | 1 | 0 | 1 |
| 7 | 0 | 1 | 1 | 1 | 0 | 1 | 0 | 0 |
| 8 | 1 | 0 | 0 | 0 | 1 | 1 | 0 | 0 |
| 9 | 1 | 0 | 0 | 1 | 1 | 1 | 0 | 1 |
| 10 | 1 | 0 | 1 | 0 | 1 | 1 | 1 | 1 |
| 11 | 1 | 0 | 1 | 1 | 1 | 1 | 1 | 0 |
| 12 | 1 | 1 | 0 | 0 | 1 | 0 | 1 | 0 |
| 13 | 1 | 1 | 0 | 1 | 1 | 0 | 1 | 1 |
| 14 | 1 | 1 | 1 | 0 | 1 | 0 | 0 | 1 |
| 15 | 1 | 1 | 1 | 1 | 1 | 0 | 0 | 0 |
Binary and Gray transforms for $b = 4$
*FIG. 19*

UD=Uniform Distribution; OUD=Optimal Uniform Distribution; AOUD=Abstracted Optimal Uniform Distribution; AOD=Abstracted Optimal Distribution; BOP=Binary Optimization Problem Optimization Performance Profiles - NPV vs Evaluation Index UD 1v (blue), OUD 5v (green), AOUD 10v (orange), AOUD 15v (red), AOD 165v (brown) and AOD 165v NoConst (purple).

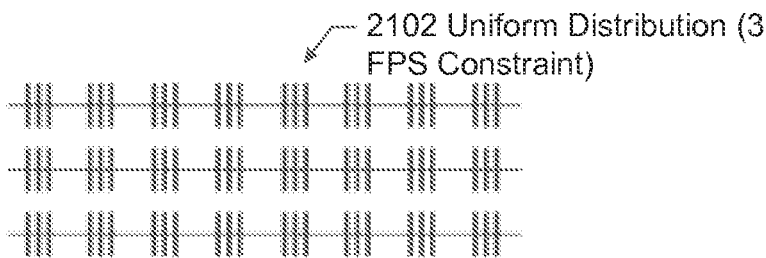
FIG. 21.1
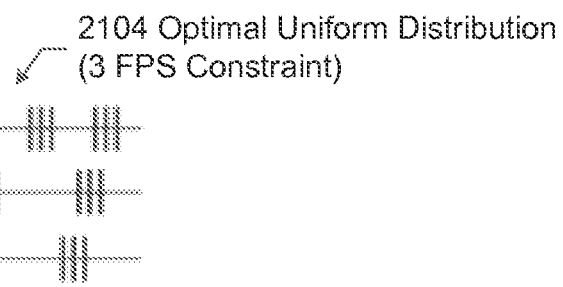
FIG. 21.2
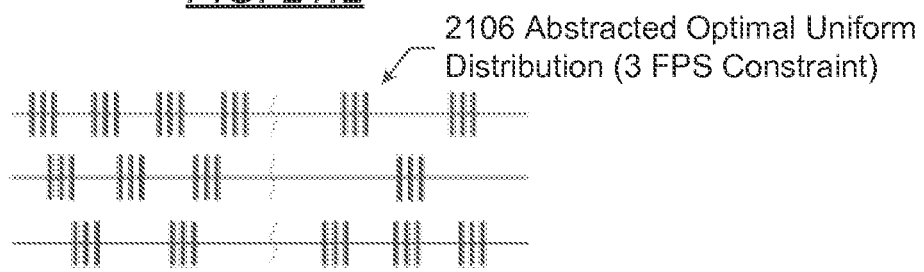
FIG. 21.3
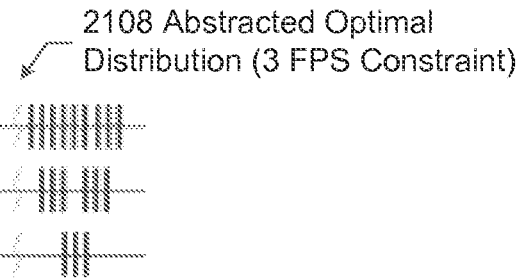
FIG. 21.4
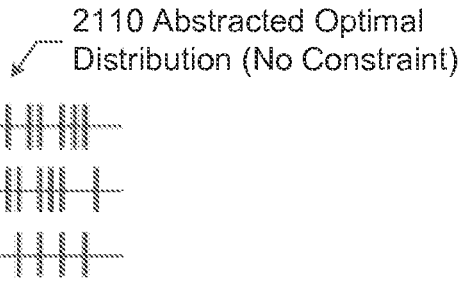
FIG. 21.5

MULTISTAGE OILFIELD DESIGN OPTIMIZATION UNDER UNCERTAINTY

CROSS-REFERENCE TO RELATED APPLICATIONS

The present application is a 35 U.S.C. § 371 National Phase application of International Patent Application No. PCT/US2015/010242 filed Jan. 6, 2015, which claims benefit under 35 U.S.C. § 119(e) of U.S. Provisional Application No. 61/924,063 filed on Jan. 6, 2014, U.S. Provisional Application No. 62/069,187 filed on Oct. 27, 2014, U.S. Provisional Application No. 62/069,194 filed on Oct. 27, 2014, U.S. Provisional Application No. 62/069,189 filed on Oct. 27, 2014, and U.S. Provisional Application No. 62/069,178 filed on Oct. 27, 2014, which are all incorporated herein by reference in their entirety.

BACKGROUND

Operations, such as geophysical surveying, drilling, logging, well completion, and production, are performed to locate and gather valuable downhole fluids from subterranean formations. A technique for extracting fluids is to induce fractures in the reservoir, thereby causing such fluids to be pulled to the surface. Such induced fractures may propagate through the subsurface formations. Various control variables define the location, geometry, number of the fractures, and, subsequently, the amount of hydrocarbon recovery.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method, system, and computer readable medium for managing oilfield operations under uncertainty. Managing oilfield operations include obtaining a subsurface model including a fracture design model having a fracture property with an uncertain value. A set of representative values that represent uncertainty in the fracture property is obtained and used to solve an oilfield optimization problem with a control variable to obtain a solution. The solution includes an optimal value for the control variable. Based on the solution, an oilfield design is generated and stored.

Other aspects of the invention will be apparent from the following description and the appended claims.

BRIEF DESCRIPTION OF DRAWINGS

FIGS. 6-10 show an example in accordance with one or more embodiments.

FIGS. 16-20, 21.1, 21.2, 21.3, 21.4, 21.5, and 22 show an example in accordance with one or more embodiments.

DETAILED DESCRIPTION

Figure 1:
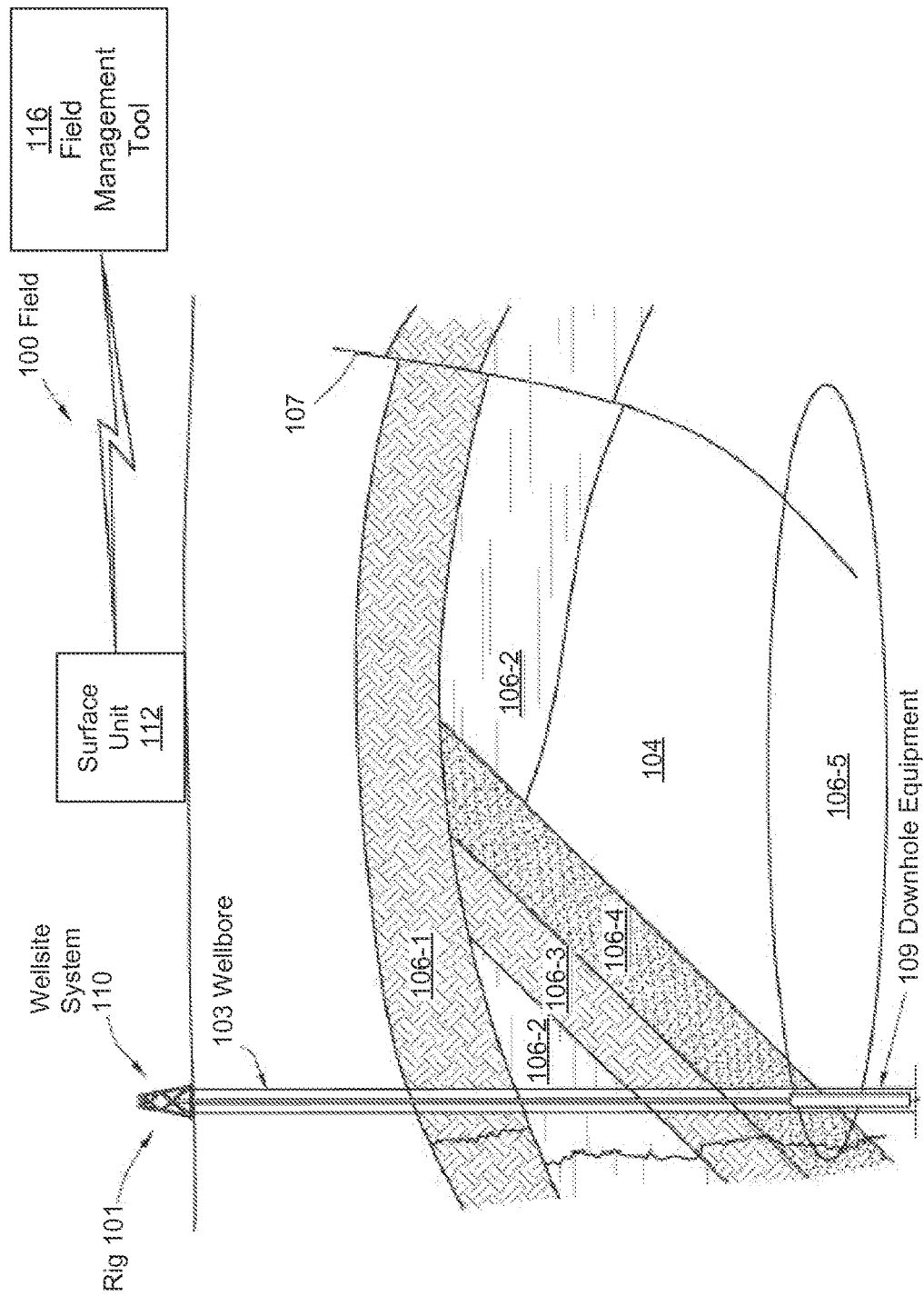
FIGS. 1 and 2 show schematic diagrams in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the claims. However, it will be apparent to one of ordinary skill in the art that the claims may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to performing oilfield optimization in the presence of uncertainty. In particular, when a subsurface model is generated, one or more model parameters in the subsurface model may be established by estimation. In other words, multiple possible values may be in conformance with the data collected at the oilfield. Such model parameters may be referred to as model parameter with uncertain values. One or more embodiments obtain a set of representative values for the model parameter having uncertain values, and solve an oilfield optimization problem with a control variable using the a set of representative values for the model parameter to obtain a solution. The solution includes optimal value for the control variable. Based on the solution, an oilfield design may be generated and stored.

FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

As shown in FIG. 1, the subterranean formation (104) may include several geological structures (106-1 through 106-4) of which FIG. 1 provides an example. As shown, the formation may include a sandstone layer (106-1), a limestone layer (106-2), a shale layer (106-3), and a sand layer (106-4). A fault line (107) may extend through the formation. In one or more embodiments, various oilfield equipment may be used in the oilfield. In general, oilfield equipment includes any physical hardware equipment used in the detection and/or extraction of hydrocarbons. For example, the oilfield equipment may include survey tools and/or data acquisition tools, have sensors that are adapted to measure the formation, and detect the characteristics of the geological structures of the formation. Further, as shown in FIG. 1, the wellsite system (110) is associated with a rig (101), a wellbore (103), and other wellsite equipment and is configured to perform wellbore operations, such as logging, drilling, fracturing, production, or other applicable operations. The wellbore (103) may also be referred to as a borehole. Generally, survey operations and wellbore operations are referred to as field operations of the field (100). These field operations may be performed as directed by the surface unit (112).

In one or more embodiments, the wellsite system may include functionality to perform hydraulic fracturing operations. Hydraulic fracturing, or fracturing, is a set of stimulation operations that uses fluid pressure to enhance well production, such as an oil and gas well, above natural production rates. Fluid pressure is applied to the rock to overcome the in situ earth stresses and strength of the rocks, causing the rock to part. Solid materials are then mixed with the fluid and pumped into the induced fracture to prevent closing of the fracture after the fluid pressure is removed. The stimulation operations create a large surface area over the adjacent rock matrix through which hydrocarbons can flow and a pathway for those hydrocarbons to reach the well. The result is that the rate of flow is greatly increased compared to an un-stimulated well in the same reservoir.

The physical dimensions of the fracture or fractures, and the fracture's confinement to the intended rock strata from which hydrocarbons will be produced, are governed, in part, by geological structures of the subterranean formation as well as the various configurable elements of the stimulation operations. For example, the properties of the rock, Earth stresses in the reservoir and bounding layers, and the pressure that is applied to the rock formations during a hydraulic fracturing treatment, and the volumes of materials used may affect the fractures. The physical dimensions may also vary with time.

The wellsite system (110) may include specialized equipment that mixes the fluid used for fracturing, adds proppant to the fluid, elevates the pressure of the fluid to a level that causes the fracture to open, and delivers the high pressure fluid to the well. The distance that the fracture propagates from the well is dependent upon the total volume of fluid and proppant that is pumped and the rate that they are injected. The fracture properties and reservoir properties may, in part, dictate flow rate and ultimate recovery of hydrocarbons from the well. The fracture properties are properties of the fracture, such as, for example, length, width, height, conductivity, tortuosity, effective porosity, effective permeability, inflow performance, closure, and other properties. The reservoir properties are properties of the reservoir and may include, for example, in situ fracture, permeability, porosity, inflow properties, skin, and other properties.

As discussed above, the amount of hydrocarbons produced and the fracture geometry are affected by the configurable elements of the stimulation operations. Configurable elements are the portions of the stimulation operations that may be defined and controlled by human or machinery, and are not part of the natural formations. For example, configurable elements may include number and location wells, number and location of stages within each well, and number of fractures induced within each stage amongst others. Configurable elements may also include amount of proppant pumped into the well, the pumping pressure, composition of fluid, distance between wells, types of drilling equipment, and other aspects of the oilfield operations.

At least some of the configurable elements may be represented as control variables. In other words, the values of the control variables are the values for implementing the configurable elements. In one or more embodiments, the values of the control variables may be defined based on a solution of an optimization problem. In other words, the solution of the optimization problem defines the optimal value for the control variables, and, subsequently, the values for the configurable elements.

In one or more embodiments, the surface unit (112) is operatively coupled to a field management tool (116) and/or the wellsite system (110). In particular, the surface unit (112) is configured to communicate with the field management tool (116) and/or the wellsite system (110) to send commands to the field management tool (116) and/or the wellsite system (110) and to receive data therefrom. For example, the wellsite system (110) may be adapted for measuring downhole properties using logging-while-drilling ("LWD") tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the field management tool (116), the wellsite system (110), or other part of the field (100). The surface unit (112) may also be provided with or functionally for actuating mechanisms at the field (100). The surface unit (112) may then send command signals to the field (100) in response to data received, for example, to control and/or optimize various field operations described above.

In one or more embodiments, the surface unit (112) is communicatively coupled to the field management tool (116). Generally, the field management tool (116) is configured to analyze, model, control, optimize, or perform other management tasks of the aforementioned field operations based on the data provided from the surface unit (112). Although the surface unit (112) is shown as separate from the field management tool (116) in FIG. 1, in other examples, the surface unit (112) and the field management tool (116) may also be combined.

The surface unit (112) and field management tool (116) may be connected to multiple wells. In particular, the configuration shown in FIG. 1 may be present at multiple wells throughout a field.

Figure 2:
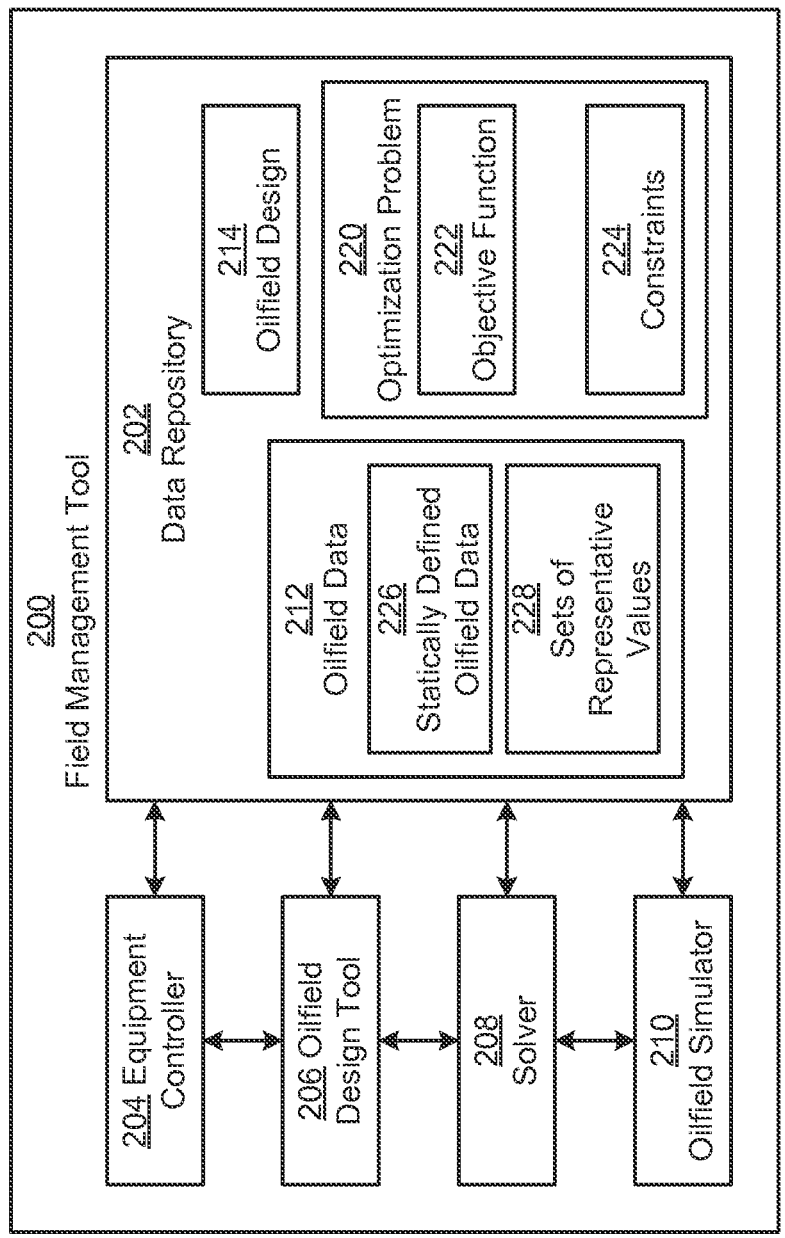

FIG. 2 shows a schematic diagram of the field management tool (200) in accordance with one or more embodiments. As shown in FIG. 2, the field management tool (200) includes a data repository (202), an equipment controller (204), an oilfield design tool (206), at least one solver (208), and an oilfield simulator (210). Each of these components is described below.

In one or more embodiments, the data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site. The data repository (202) includes functionality to store oilfield data (212), an oilfield design (214), and an optimization problem (220) having an objective function (222) and constraints (224).

In one or more embodiments, the oilfield data (212) includes statically defined oilfield data (226) and sets of representative values (228). In general, the oilfield data, including the statically defined oilfield data (226) and sets of representative values (228), include raw, preprocessed (e.g., for validation), and processed data describing an oilfield. Oilfield data may include data received by the surface unit and representing characteristics of the subterranean formation. In one or more embodiments, oilfield data may be gathered by the various data acquisition tools that are in the oilfield. Oilfield data may include microseismic data, logs, data gathered from core samples, and production data. Oilfield data may include information related to porosity, saturation, permeability, natural fractures, stress magnitude and orientations, elastic properties, produced hydrocarbons, etc. during a drilling, fracturing, logging, or production operation of the wellbore at the wellsite system. Oilfield data may include data gathered at the wellsite in which the simulation operations are being performed and/or data gathered at other wellsites. Oilfield data may also include an oilfield model, a reservoir model, or other model of the field.

Statically defined oilfield data (226) is oilfield data that is deemed static. In other words, the values may be deemed constantly defined for the purposes of solving the optimization problem. The statically defined oilfield data (226) may change as new data is received, such as new measurement values from one or more sensors are received. The statically defined oilfield data (226) may also change based on configuration. For example, a user may configure the field management tool (200) to set some oilfield data as statically defined for various executions of solving the optimization problem.

Sets of representative values (228) are information about model parameters that have an uncertain value. Specifically, because information about the subsurface of the Earth may not be perfectly known, but rather is inferred based on factors, such as similar oilfields, sensor data, assumptions about some of the properties of underlying formations, such information may be subject to uncertainty. In other words, the values of the model parameters are not well defined. A set of representative values is a collection of possible values for a model parameter having an uncertain value. In other words, a set of representative values are two or more values that capture underlying variation in the model parameter. In particular, each model parameter having an uncertain value may have an associated set of representative values. In one or more embodiments of the invention, the set of representative values may be a sampling from a probability density function, Monte Carlo method, design of experiment methods (e.g., Latin hypercubes), experts, or other source, or combination of sources. A probability density function relates a value with a probability that the model parameter is the value. In one or more embodiments of the invention, the model parameters that have uncertain values may include fracture properties, reservoir properties, other properties, and a combination thereof.

Continuing with FIG. 2, an oilfield design (214) is a field plan for performing oilfield operations in accordance with one or more embodiments. For example, the oilfield design may include values for each of the configurable elements of the field, such as the location and parameters for the fracturing operations, parameters for oilfield equipment and other configurable elements.

In one or more embodiments, an optimization problem (220) is a problem of finding the best solution (i.e., most optimal solution) from the feasible solutions. In other words, a solution is a particular value for each control variable representing a configurable element of the oilfield. The optimization problem (220) for the oilfield is a problem to find the most optimal values for the control variables. The optimization problem (220) includes an objective function (222) and constraints (224). The objective function (222) is a utility function or loss function in an oilfield optimization problem. In one or more embodiments, the objective function may be defined as maximizing the net present value (NPV) over a defined period of time. Other objective functions may be used without departing from the scope of the claims. For example, the objective function may be to maximize gross revenue, minimize costs, maximize hydrocarbon production, or achieve another objective. Constraints (224) are limits on the possible feasible configurations. In other words, the constraints (224) limit which configurations are feasible configurations. For example, a constraint may be a minimum distance between wells, a maximum number of stages, a maximum amount of fluid, and other limits on the design.

Continuing with the field management tool (200), the equipment controller (204) includes functionality to send control signals to the oilfield equipment at the oilfield. Specifically, the equipment controller may include functionality to receive an oilfield design (214) and transmit signals to the oilfield equipment to perform oilfield operations in accordance with the oilfield design.

The oilfield design tool (206) includes functionality to generate an oilfield design (214) based on configurable elements of the oilfield in accordance with one or more embodiments. In particular, the oilfield design tool (206) includes functionality to obtain the configurable elements of the oilfield, generate a binary variable array based on at least some of the configurable elements, transform the binary variable array into integer variables, and issue a call to a solver to obtain a solution. The oilfield design tool may include a user interface to interface with a user to create the oilfield design. For example, the oilfield design tool may include functionality to receive input data from the user and present metrics and an optimal solution to the user.

The solver (208) includes functionality to solve the optimization problem (220) in accordance with one or more embodiments. For example, the solver (208) may be a downhill simplex method, an Augmented Lagrangian method, a gradient-based mixed integer nonlinear problem solver, a derivative-free evolutionary heuristic solver, a genetic algorithm designed to handle mixed-integer variables, or any other suitable solver for the given problem.

The oilfield simulator (210) includes functionality to simulate the oilfield given a set of configurations and models. In particular, the oilfield simulator (210) includes functionality to simulate the fracture geometry and determine the resulting flow of hydrocarbons provided a defined configuration of configurable elements.

While FIGS. 1 and 2 shows a configuration of components, other configurations may be used without departing from the scope of the invention. For example, various components may be combined to create a single component. As another example, the functionality performed by a single component may be performed by two or more components.

Figure 3:
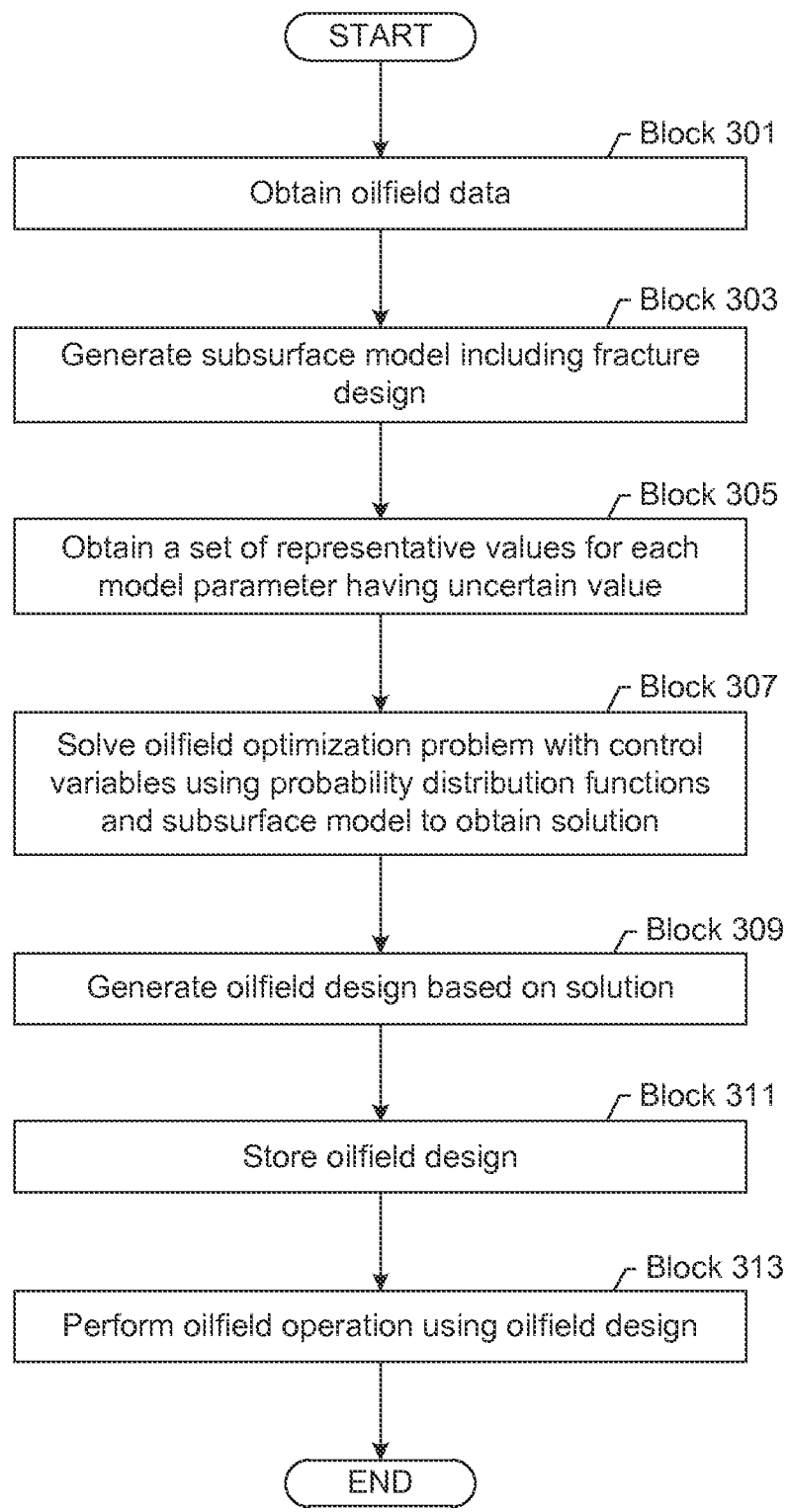
FIGS. 3-5 show flowcharts in accordance with one or more embodiments.
Figure 4:
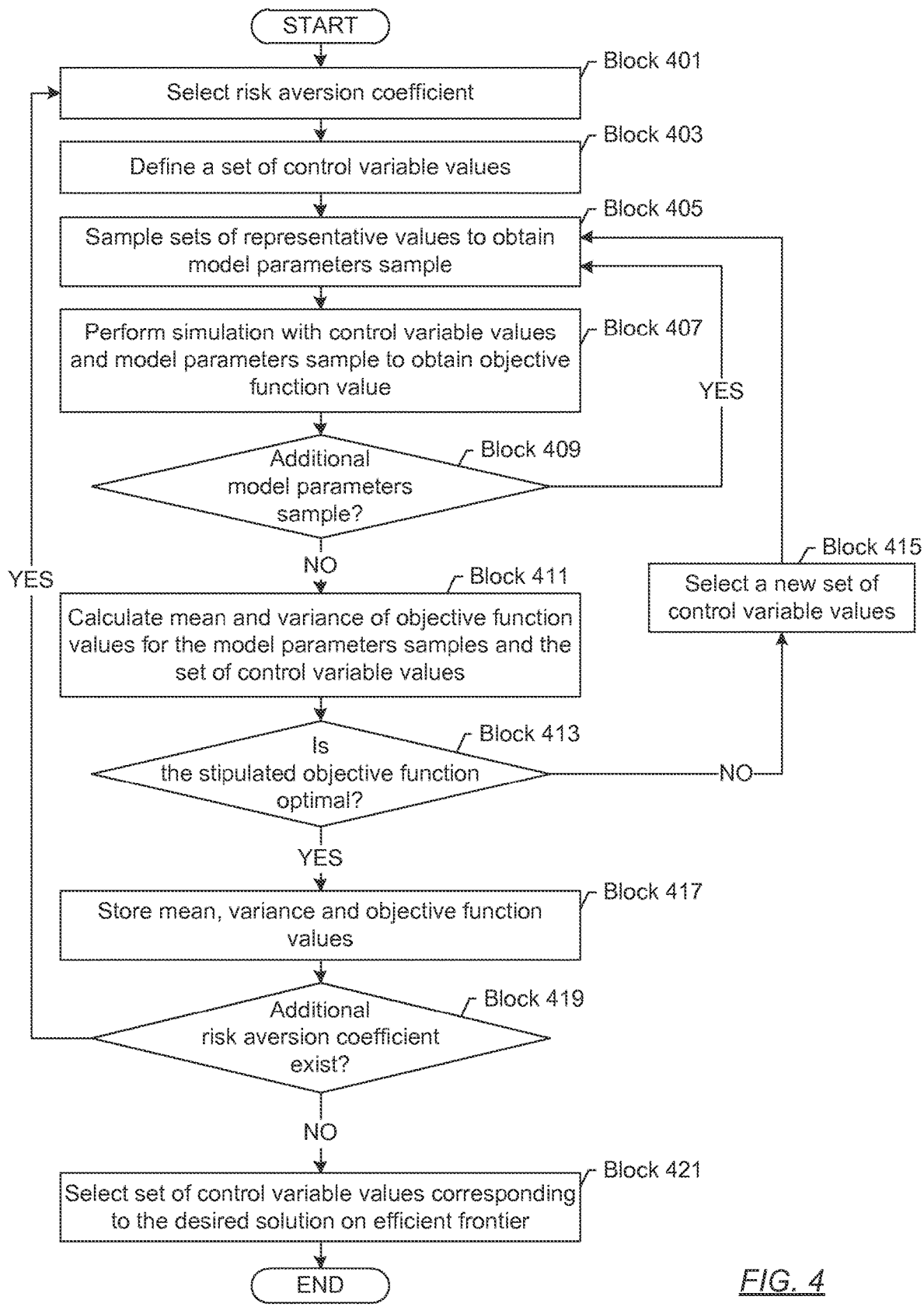
Figure 5:
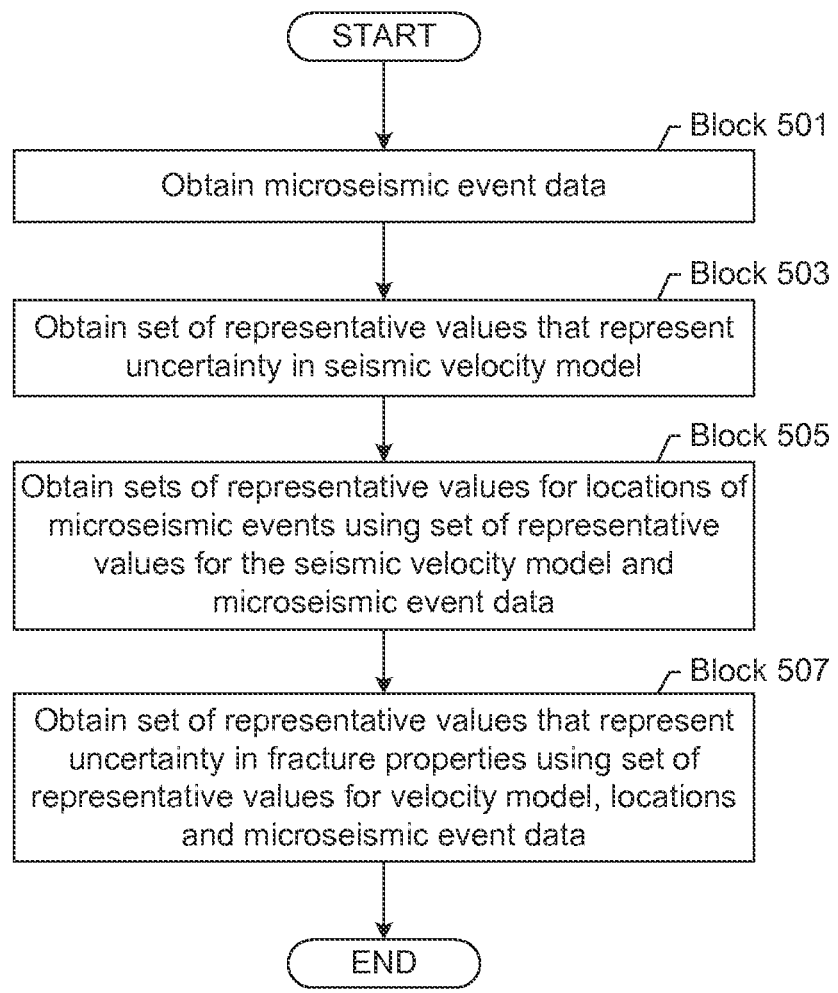

FIGS. 3-5 show flowcharts in accordance with one or more embodiments. While the various blocks in these flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt-driven in accordance with one or more embodiments. By way of an example, determination blocks may not require a processor to process an instruction unless an interrupt is received to signify that a condition exists in accordance with one or more embodiments. As another example, determination blocks may be performed by performing a test, such as checking a data value to test whether the value is consistent with the tested condition in accordance with one or more embodiments.

In Block 301, oilfield data is obtained in accordance with one or more embodiments. The obtaining of oilfield data may be performed by directly or indirectly from oilfield equipment. For example, sensors located in the oilfield may measure oilfield data and transmit the data to the field management tool. For example, exploratory vertical wells and horizontal wells may be drilled. The exploratory vertical wells and horizontal wells may be used to establish property distributions and information about vertical layering of formations. Core samples, logs, and fluid samples may be obtained and analyzed. For example, core samples may be taken and analyzed to identify porosity, permeability, composition, and other physical properties of the subsurface region. Sensors may be used to gather pressure, volumetric flow data, and production information. Perforation and hydraulic fracturing at various depths may be used to measure microseismic data, the near-well stress field and the potential of fractures to permeate the reservoir layers identified from core samples. Additional data may be gathered from other oilfields, before, concurrently, or after the gathering of the oilfield data from the oilfield being analyzed. The gathered oilfield data may include raw and/or preprocessed data. The gathering of data may be performed during exploration, production, and completion phases of the oilfield. For example, production data from the initial test wells is also gathered for use in history-matching the reservoir simulation model.

In Block 303, a subsurface model is generated in accordance with one or more embodiments. In particular, from the oilfield data a model is generated that estimates the subsurface formations. In some embodiments, the subsurface model includes a fracture design model that represents one or more subsurface fractures. Geoscientists and reservoir engineers may use the oilfield data obtained in Block 301 to construct at least one expected geological model or a set of geo-statistically reasonable models. Various techniques may be used to generate a model. For example, history matching of the reservoir simulation model may be used. The model(s) may represent the property distributions of physical properties at the oilfield.

In Block 305, a set of representative values is obtained for each model parameter having an uncertain value in accordance with one or more embodiments. In generating the oilfield model, some model parameters of the subsurface may be deemed uncertain. Which model parameters are set as uncertain and which model parameters are deemed static may be determined based on the degree of uncertainty of the model parameters. In such embodiments, the field management tool may set the model parameters as either static or uncertain. In one or more embodiments, a user may define which model parameters are static and which model parameters are uncertain. Obtaining the representative values for the model parameters having uncertain values may be performed by generating probability density functions and sampling from the probability density function, performing Monte Carlo method, designing of experiment methods such a Latin Hypercubes, soliciting experts. FIG. 5 shows a flowchart for performing Blocks 301-305 using microseismic data to obtain set of representative values for fracture properties.

Continuing with FIG. 3, in Block 307, the oilfield optimization problem with control variables is solved using sets of representative values and subsurface model to obtain a solution in accordance with one or more embodiments. Solving the oilfield optimization problem is discussed below with reference to FIG. 4.

In Block 309, an oilfield design is generated based on the solution in accordance with one or more embodiments. The oilfield design may be the raw solution. In other embodiments, the oilfield design may be a translation of the solution into a specification for oilfield equipment. For example, if the control variables are defined at a cell level of the subsurface model, obtaining the oilfield design may include translating the values at the particular cells to a definition of locations in which drilling operations or simulation operations are to occur. For example, rather than describing each cell and whether each cell contains a fracture, the oilfield design may specify the measured depths along the trajectory of the wellbore that indicates the location of the fracture in the solution. In such a scenario, a mapping function may be accessed to determine which cells in the model correspond to the trajectory of the wellbore in order to obtain the oilfield design. Other techniques for obtaining the oilfield design may be used without departing from the scope.

In Block 311, the oilfield design is stored in accordance with one or more embodiments. In particular, the oilfield design may be stored, in whole or in part, temporarily or permanently, on a physical storage device, such as in the data repository or in cache.

In Block 313, an oilfield operation is performed using the oilfield design in accordance with one or more embodiments. In one or more embodiments, the equipment controller may send a control signal to the oilfield equipment located at the oilfield. The control signal may include the oilfield design or actions to perform based on the oilfield design. In response, the oilfield equipment may perform the operations specified by the oilfield design by physically drilling wells or performing the various stimulation operations. The oilfield operations may or may not be performed with human interaction, such as to control or watch the equipment.

In one or more embodiments, at various stages of the method, the oilfield design tool may interact with the user through the user interface to obtain the solution, obtain the oilfield design and control the oilfield equipment. For example, the oilfield design tool may present metrics regarding solving the optimization problem, the solution, the oilfield design, other information, or any combination thereof, and the user may submit commands to control the optimization and the oilfield design. For example, the user may decide that the current solution is the most optimal solution given the number of iterations performed, set a maximum number of iterations (e.g., by defining the maximum number of iterations, specifying a maximum execution time, or performing any other such action), and approve or disapprove of the oilfield design.

FIG. 4 shows a flowchart for solving an oilfield design problem in accordance with one or more embodiments. In Block 401, a risk aversion coefficient is selected in accordance with one or more embodiments. One or more embodiments iterate through multiple risk aversion coefficients. In general, the risk aversion coefficient is a scaling factor that defines the amount of risk in the selection of a particular set of control variable values.

In Block 403, a set of control variable values are defined in accordance with one or more embodiments. As discussed above, the set of control variables define values for the physical configurable elements of the oilfield, and are defined based on the requirements for the oilfield design. For example, if the oilfield design is for an initial plan of the oilfield, the configurable elements may include position and direction of boreholes. In contrast, if the oilfield design is for performing fracturing operations on a reservoir with existing wells, the configurable elements may include locations of stages, number of fractures per stage, fluid properties, etc. By way of an example, a user using the oilfield design tool may specify which elements of the oilfield design are configurable. In some embodiments, possible control variables are specified by the oilfield design tool for any oilfield design. The possible control variables may be presented to the user who selects from the possible control variables or types of control variables. Prior to selection, a portion of the control variables that are inapplicable may be removed. In some embodiments, the types of control variables, such as control variables defining the number and location of stages in any given well in the pad, the number of wells in a pad, the aerial spacing between wells, and the number of fractures per stage in each well and the fracture's optimal half-length(s), are identified.

In one or more embodiments, the set of control variable values initially defines a starting configuration for the system. The starting configuration may be a default configuration, an estimated configuration based on historical information associated with the oilfield or another oilfield, a configuration proposed by a user, another selected configuration, or a combination thereof. Through optimization, the set of control variables values may be refined to an optimized control variable value.

In Block 405, the sets of representative values are sampled to obtain a model parameter sample in accordance with one or more embodiments. In particular, a value is obtained for each model parameter having an uncertain value. The value may be a randomly selected value, a value selected based on the probability of the value, selected in conformance with a particular order, or another method of selection.

In Block 407, a simulation is performed with control variable values and model parameters samples to obtain an objective function value in accordance with one or more embodiments. In one or more embodiments, the simulation is run using the subsurface model, based on the model parameters having the values in the model parameter sample, and the control variables having the corresponding values. The result of the simulation is a particular realization value of the simulation-based function in an optimization problem. In other words, a realization is a particular set of values of the parameters deemed to be uncertain in the model. The value of a particular realization is the value of the simulation-based merit function of interest (e.g., NPV, etc.). For example, the result may be the geometry of the fracture, the expected hydrocarbon, net present value of the expected hydrocarbon produced, or another measure.

In Block 409, a determination is made whether an additional model parameters sample exists in accordance with one or more embodiments. One or more embodiments may iterate through each model parameter sample. In other embodiments, the field management tool may stop processing once a representative set of model parameter samples are deemed processed (e.g., desired realizations have been evaluated). In such embodiments, rather than performing the simulation with each variation of model parameter sample, the simulation is performed until a threshold number of samples are processed. If a determination is made that additional model parameter samples exist, then the flow may repeat with block 405 of sampling the sets of representative values in accordance with one or more embodiments.

In Block 411, the mean and variance of the realization values are calculated for the model parameter samples and the set of control variable values in accordance with one or more embodiments. In one or more embodiments, the mean provides an expected value for the objective function given the set of control variable values specified in Block 403. The variance provides a degree of variability between the objective function values. Thus, the variance indicates the degree of variability over the realization values.

In Block 413, a determination is made whether the stipulated objective function is optimal. Whether the stipulated objective function is optimal may be dependent on the type of objective function. In other words, if the objective function is a cost function, then the solution is optimal when a minimal value is reached. If the objective function is a utility function, then the solution is optimal when the maximal value is obtained. In some embodiments, the field management tool may limit a number of iterations to determine optimal value and wait for convergence (e.g., when subsequent iterations are within a threshold difference from each other). In such a scenario, the optimal value may be the optimal identified value.

The optimal value may also accounts for the variance. In general, a smaller variance is better as a smaller variance indicates a greater degree of reliability that the actual value is the same or similar to the mean. In some cases, a first set of control variable values may have a better mean, but a greater variance than a second set of control variable values. In the example, the field management tool may be configured with a function based on the mean, variance, and risk aversion coefficient to score the various solutions. The risk aversion coefficient provides a factor to apply the variance when selecting an optimal mean and variance. In one or more embodiments of the invention, the function may be, for example, $F_y(X)=\mu-\gamma\sigma$, where X is the set of control variable values, $\mu$ is the mean calculated in Block 411 for the set of control variable values, y is the risk aversion coefficient, and $\sigma$ is the standard deviation or square root of the variance calculated in Block 411 for the set of control variable values. Other functions may be used to incorporate the variance with the mean in determining an optimal set of control variable values without departing from the scope of the claims.

In Block 415, a new set of control variable values are selected in accordance with one or more embodiments. The selection of new set of control variable values is established by the optimization method employed. For example, a derivative-free simplex method will perturb the incumbent polytope to provide a new test condition. A gradient-based method will attempt a line search along a descent direction. For approximation-based schemes, any solver can be applied on the analytical closed-form representation and the best solution established is often used as the new candidate set of control variable values. The flow may repeat with Block 405 for the new set of control variable values in accordance with one or more embodiments.

Returning to Block 417, if the objective function value has been optimized, the mean and variance of the objective function values are stored in accordance with one or more embodiments. In particular, the mean and variance may be stored, in whole or in part, temporarily or permanently, on a physical storage device, such as in the data repository or in cache. The mean and variance may be stored with the corresponding set of control variable values. Although not shown in FIG. 4, the mean and variance may be stored regardless for each design configuration evaluated. Such information may be used to help establish the efficient frontier (a plot of reward as defined by the mean versus the risk as defined by the standard deviation or square root of the variance). In other words, the efficient frontier is a plot of the mean versus standard deviation (of the underlying realizations) over all samples tested (in the control space X).

In Block 419, a determination is made whether an additional risk aversion coefficient is selected in accordance with one or more embodiments of the invention. If an additional risk aversion coefficient exists, the method may repeat with the next risk aversion coefficient in accordance with one or more embodiments.

In Block 421, set of control variable values corresponding to the desired solution on the efficient frontier is selected in accordance with one or more embodiments. As shown above, each risk aversion coefficient has a corresponding optimal mean and variance that each corresponds to a set of control variable values. In other words, the desired solution is the optimal objective function value based on an acceptable level of risk and is on the efficient frontier. The set of control variable values corresponding to the desired solution is selected. In other words, the desired solution may be deemed to include the set of control variable values. The field management tool may be configured with a selection function based on the value of $F_y(X)$ and the risk aversion coefficient of each of the optimal values selected in Block 417.

Although not presented above, various techniques may be used to optimize the control variables given a model parameter sample. Any of such techniques may be applied to the present application to perform Blocks 403, 407, 413, and 415. In some embodiments, at least a portion of the control variables may be binary variables. In such a scenario, Blocks 403, 407, 413, and 415 may be performed as described below with reference to FIGS. 11-22. In the technique shown in FIGS. 11-22, the binary variables are treated as continuous variables for the purposes of the optimization. The value of the mean may be used to select the new set of control variable values.

FIG. 5 shows a flowchart for using microseismic data to gather sets of representative values for fracture properties. In the following discussion, the hydraulic fracture geometry from the passive microseismic data recorded during the hydraulic fracturing is estimated. The estimation may be based on the fact that the locations of the microseismic events that generate the microseismic data are unknown. However, based on estimated sets of representative values that represent uncertainty in seismic velocity, the sets of representative values for fracture properties that is created by the hydraulic fracturing process may be estimated in a two-phase process. In the first phase, the sets of representative values associated with the locations of the detected microseismic events are estimated. In the second phase, the degree to which the reduction of uncertainties in the anisotropic velocity model propagates into the sets of representative values associated with the estimated fracture properties is quantified.

In Block 501, microseismic event data is obtained in accordance with one or more embodiments. After perforation shots, high-pressure fluid may pumped into the formation to fracture the reservoir rocks and thereby increase the flow conductivity towards the producing wells. During the hydraulic fracturing of the reservoir, downhole monitoring sensors that are used to monitor the perforation shots are also used to record the microseismic waveforms each time that a microseismic event is detected.

In Block 503, a set of representative values is obtained that represent uncertainty in a seismic velocity model in accordance with one or more embodiments. The set of representative values for the velocity model may be a provided distribution and may be generated based on information about subsurface formations, such as rock type, permeability, and other information. The information about subsurface formation may be generated using core samples and other data acquisition techniques.

In Block 505, sets of representative values for locations of microseismic events are obtained using a set of representative values for the velocity model and microseismic event data. In particular, the measurements that may be used to infer the locations of the microseismic events include the difference between the direct P- and Sv-wave arrival times, and of the azimuths at which the direct P-wave and direct Sv-wave arrive at the monitoring receivers. For each monitoring receiver, the azimuths for the P- and Sv-waves are estimated from the 3-C sensor waveforms.

For example, consider the scenario in which the set of representative values are obtained using probability density functions. Random sampling of the probability density functions associated with the anisotropic velocity model may be performed to obtain several realizations estimating the location of the microseismic event. Consider $V_l$ as a random sample of the velocity model. For the velocity model, the difference between arrival times and azimuth measurements may be inverted by quantifying the posterior probability distribution, $p_{k,V_l}(x_k=x)=p(x_k=x|V_l,\hat{T}_k)$, that any location $x=(x,y,z) \in R^3$ of the search area can explain the observed data as being the location, $x_k$, at which the $k^{th}$ detected microseismic event is originated ($k=1,KN_e$). For each of the $N_e$ events, the set of $N_q$ realizations of the location of that $k^{th}$ event by randomly sampling from $p_{k,V_l}$ is computed.

As discussed above, each microseismic event is processed to compute a set of realizations. Once the detected events are processed, for the velocity model sample, $V_l$, the two-dimensional set of realizations may be obtained using the following equation:

$$\bigcup_{k=1}^{N_e}\left(\bigcup_{n=1}^{N_q} x_{k,n,v_l}\right) = \bigcup_{n=1}^{N_q}\left(\bigcup_{k=1}^{N_e} x_{k,n,v_l}\right). \quad (1)$$

The right side of Equation 1 expresses the fact that each of the $N_q$ realizations includes a probable set of microseismic event locations. In other words, for the given $n^{th}$ realization, the epicenter of the microseismic event cloud and the orientation of the microseismic event cloud may be estimated using the probability distribution functions.

In Block 507, the sets of representative values that represent uncertainty in the fracture properties are obtained using sets of representative values for the velocity model, sets of representative values for location of microseismic events, and microseismic event data. In other words, given the sets of representative values associated with the anisotropic velocity model, the sets of representative values related to the fracture width, length, height, and the fracture's estimated stimulated volume may be estimated. The following is a discussion of generating sets of representative values for at least some of the fracture properties.

Let V be the ensemble of $N_v$ random samples of the anisotropic velocity model. To account for probable $N_v$ anisotropic velocity model samples, the probability distribution of a fracture property, D, such as the fracture width, length, height, or stimulated volume, may be estimated from the set of $N_v*N_q$ realizations using Eq. 2:

$$\{D_{l,n}\} = \bigcup_{l=1}^{N_v} \bigcup_{n=1}^{N_q} \left[ D_{l,n} \left( \bigcup_{k=1}^{N_e} x_{k,n,v_l} \right) \right] \quad \text{(Eq. 2)}$$

One or more embodiments estimate the fracture properties from microseismic data by performing the following. One or more embodiments may constrain the estimation of the anisotropic velocity model by the secondary-source Sv-wave arrivals observed on the perforation shot data leading to a much smaller variance of the velocity model distribution. Further, for any probable velocity model, the uncertainties in the event locations are computed and displayed, but the uncertainties probability distributions are sampled to produce $N_q$ realizations of probable microseismic clouds from which the probability distributions of any geometry property of the cloud can be computed. Additionally, the final probability distributions of the geometry properties of the hydraulic fracture are obtained from the set of $N_v*N_q$ realizations after accounting for probable models of the velocity and event location distributions.

FIGS. 6-10 show examples in accordance with one or more embodiments. The example shown in FIGS. 6-9 are for explanatory purposes and not intended to limit the scope of the invention.

Figure 6:
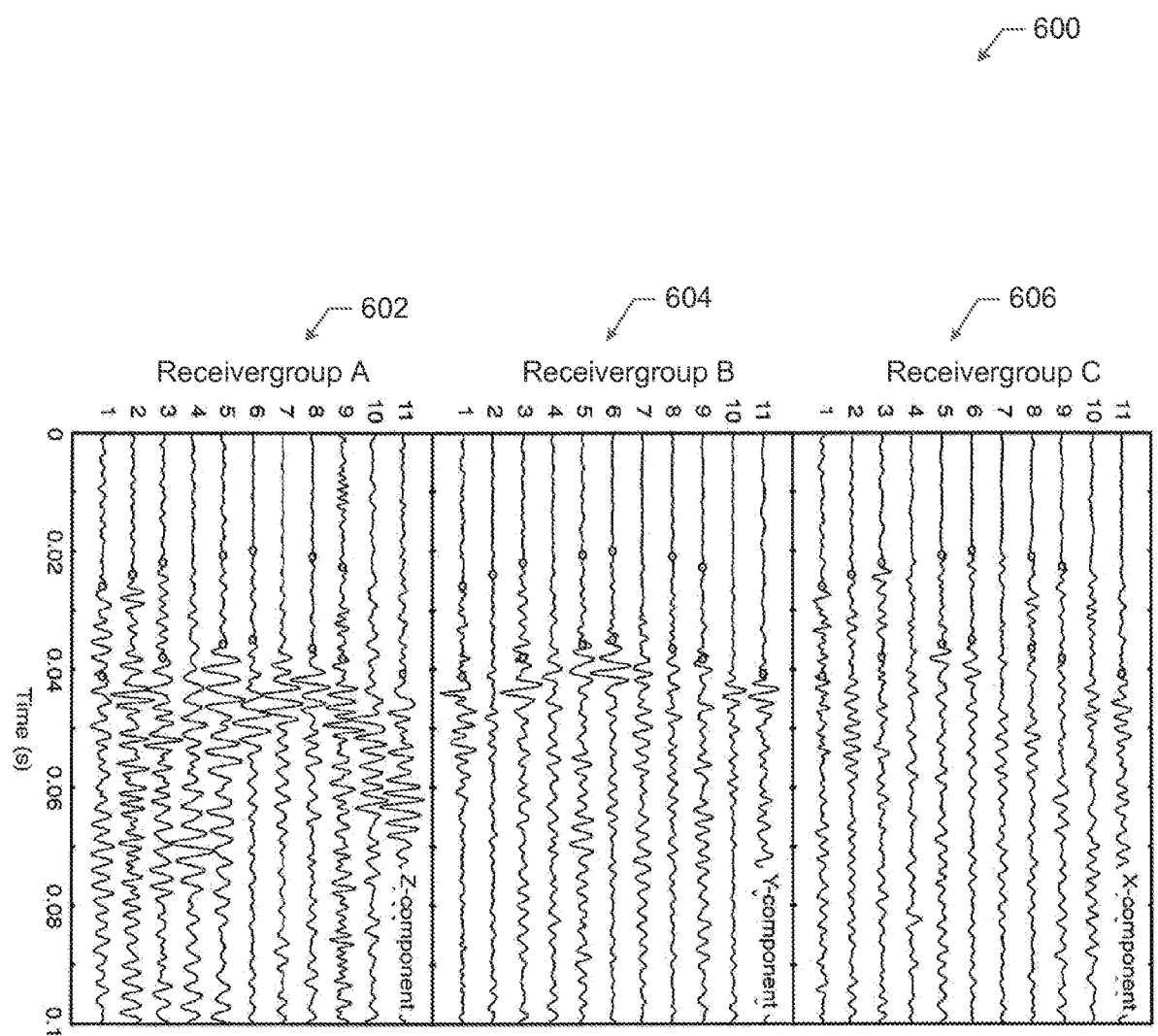

FIG. 6 shows a graph (600) of seismic data gathered by three different receiver groups (e.g., receiver group A (602), receiver group B (604), and receiver group C (606)) for the same microseismic event. Each receiver group includes a set of receivers (e.g., receivers 1-11 in FIG. 6) that are located at a specified location in the oilfield. The circles on the graphs mark the travel times of the p-waves, which are temporally the first circle in each line, and the sv-waves, which are temporally the second circle.

As discussed above, using the microseismic data and a velocity model, such as shown in FIG. 6, probability distribution functions for locations of the microseismic events may be obtained. FIG. 7 shows an example set of charts (700) of two realizations of the microseismic event clouds that estimated for a given velocity model. Although two realizations are shown, virtually any number of realizations may be implemented and used in analysis. In the example set of charts (700), the vertical axis represents depth, and the remaining axes are North and East. As shown in FIG. 7, by having the multiple realizations, the uncertainty in the velocity model propagates to an uncertainty in the locations of the microseismic events. The grayscale shading in FIG. 7 of a location in a chart indicates the probability that the corresponding location is sampled given the probability distribution of the event location.

In the example, $N_e$=66 is given, while $N_v$=150 and $N_q$=300 are selected. Based on $N_e$=66, $N_v$=150, and $N_q$=300, a set of 45,000 realizations exist from which the histograms of the fracture width, length, height, and estimated stimulated volume may be computed. The correlations existing between the width and length, the width and height, and between the length and height may also be computed, and account for the uncertainties in the velocity distributions as well as for the uncertainties (for a given velocity) in the estimated microseismic event locations. The correlations may be used for reservoir production forecasting by constraining the history matching of the production data with the reservoir and fracture properties.

Figure 8:
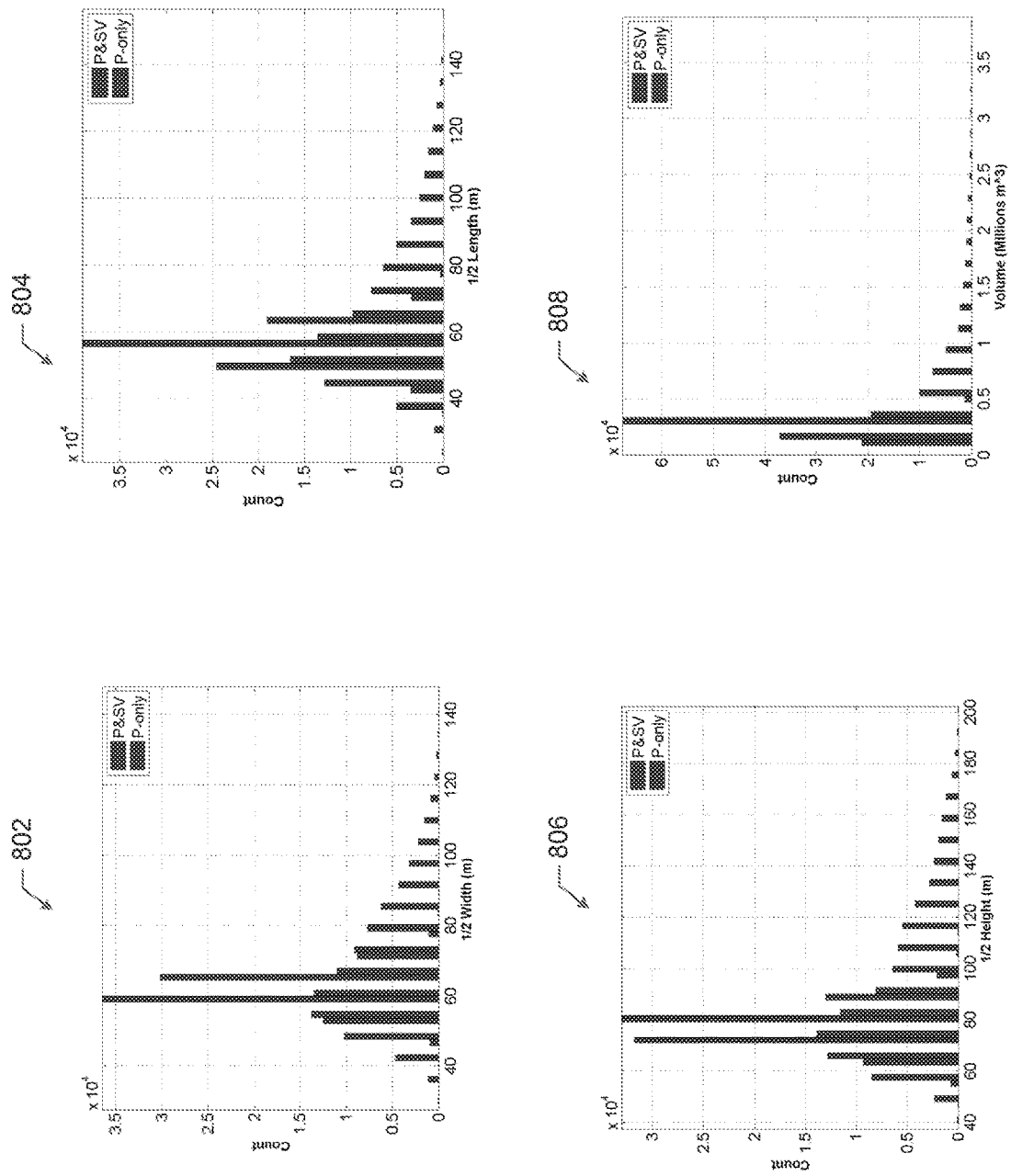

FIG. 8 shows example graphs of probability distribution functions generated considering p-wave only when determining the velocity probability distribution, and p-wave and sv-wave when determining the velocity probability distribution that is then used for fracture properties. The graphs of fracture properties include fracture width (802), fracture length (804), fracture height (806), and expected fracture volume (808). Fracture width refers to the width of the microseismic event cloud. The fracture geometry distributions obtained when using Sv-waves tend to have a Gaussian distribution, which reflects the shapes of the velocity distributions. As shown in FIG. 8, the uncertainties associated with the fracture geometry may be reduced when combining P- and Sv-wave arrivals to estimate the anisotropic velocity model distributions as opposed to just using P-wave.

The covariance matrices associated with the estimated fracture width, length and height for the two velocity distributions may be written as:

$$Cov_P = 10^{-3} \begin{pmatrix} 0.3271 & 0.3463 & 0.4769 \\ 0.3463 & 0.4432 & 0.5624 \\ 0.4769 & 0.5624 & 0.8574 \end{pmatrix},$$

$$Cov_{P\ \&\ S_v} = 10^{-4} \begin{pmatrix} 0.2947 & 0.0719 & 0.0976 \\ 0.0719 & 0.3572 & 0.1010 \\ 0.0976 & 0.1010 & 0.6117 \end{pmatrix}.$$

The associated correlation matrices can be written as:

$$Cor_P = \begin{pmatrix} 1.0000 & 0.9097 & 0.9007 \\ 0.9097 & 1.0000 & 0.9124 \\ 0.9007 & 0.9124 & 1.0000 \end{pmatrix},$$

$$Cor_{P\ \&\ S_v} = \begin{pmatrix} 1.0000 & 0.2217 & 0.2298 \\ 0.2217 & 1.0000 & 0.2161 \\ 0.2298 & 0.2161 & 1.0000 \end{pmatrix}.$$

As shown by the two sets of matrices above, the use of secondary-source Sv-waves reduces the covariance values and the correlation between the width and length, the width and height, and the height and length of the stimulated fracture.

Table 1 below provides mean and standard deviation values of the estimated width, length, height, and stimulated volume of the fracture as seen by the cloud of microseismic events. The two velocity probability distributions considered and correspond to using P-wave and using both direct P-wave and secondary-source Sv-wave respectively to estimate the velocity models.

TABLE 1

|  |  | Width (m) | Length (m) | Height (m) | Volume ($10^6$ m$^3$ = GL) |
|---|---|---|---|---|---|
| P-only: | Mean | 67.275 | 57.110 | 78.322 | 0.5004 |
|  | Deviation | 18.104 | 21.0561 | 29.310 | 0.5077 |
| P & Sv: | Mean | 62.450 | 64.130 | 90.441 | 0.2812 |
|  | Deviation | 5.404 | 5.966 | 7.808 | 0.0576 |

While the mean values of the fracture width, length and height vary relatively by 7.17%, −12.30%, and −15.47% as shown, respectively for the two velocity distributions being compared, the mean value of the estimated volume differs by 43.80%. In the example, a volume estimate of 0.5004 may be obtained when not using Sv-waves compared to an estimate volume of 0.2812. The smaller estimated volume may be more accurate since as the smaller estimated volume honors the travel times of both direct P-wave and secondary-source Sv-wave arrivals observed on the perforation microseismic data. Moreover, the variance of the stimulated volume distribution may be reduced by more than a factor of 75 when using the secondary-source Sv-waves for estimating the anisotropic velocity distribution in some embodiments. In one or more embodiments, probability distributions for the fracture width, length and height are considered.

In one or more embodiments, multi-stage fracture design may be improved while accounting for uncertainties over an ensemble of history-matched reservoir models, which are inputs to the improvement process. For example, the number of wells to be assigned per pad can be increased. In one possible aspect, the possible number of wells per pad can range from a minimum of 1 to a maximum of 10 wells, or a minimum of 2 to a maximum of 5 wells. These numbers can increase or decrease in other aspects.

For instance, the fracture half-length may be used as an input parameter in the multi-staging design improvement process. Information from a geological stress map may be used to assign particular fracture geometries along a well. In the absence of such data, in accordance with one or more embodiments, a specific half-length may be selected for investigation or, as presented here, the fracture half-length may be treated as an uncertain parameter in the design process. In addition, in the absence of prior information on the expected fracture length, the fracture length may be considered known (deterministic case with no uncertainty) and/or that the uncertainty is represented by a probability distribution of some form. In the latter case, improvement under uncertainty may be performed with a number of realizations for each equal probable fracture geometry in evaluation of an objective function accounting for the uncertainty in the fracture half-length.

As an example of optimization under uncertainty, simulation models ranging from 2 to 5 wells over a pad model of a field may be considered for NPV maximization using a uniform spacing of a given number of stages (with 3 fractures per stage), over all wells with three possible fracture lengths: namely 75, 125 and 175 feet. Assuming a uniform distribution of the fracture half-length, each objective function evaluation may include 3 realizations, one for each fracture design of interest.

Figure 9:
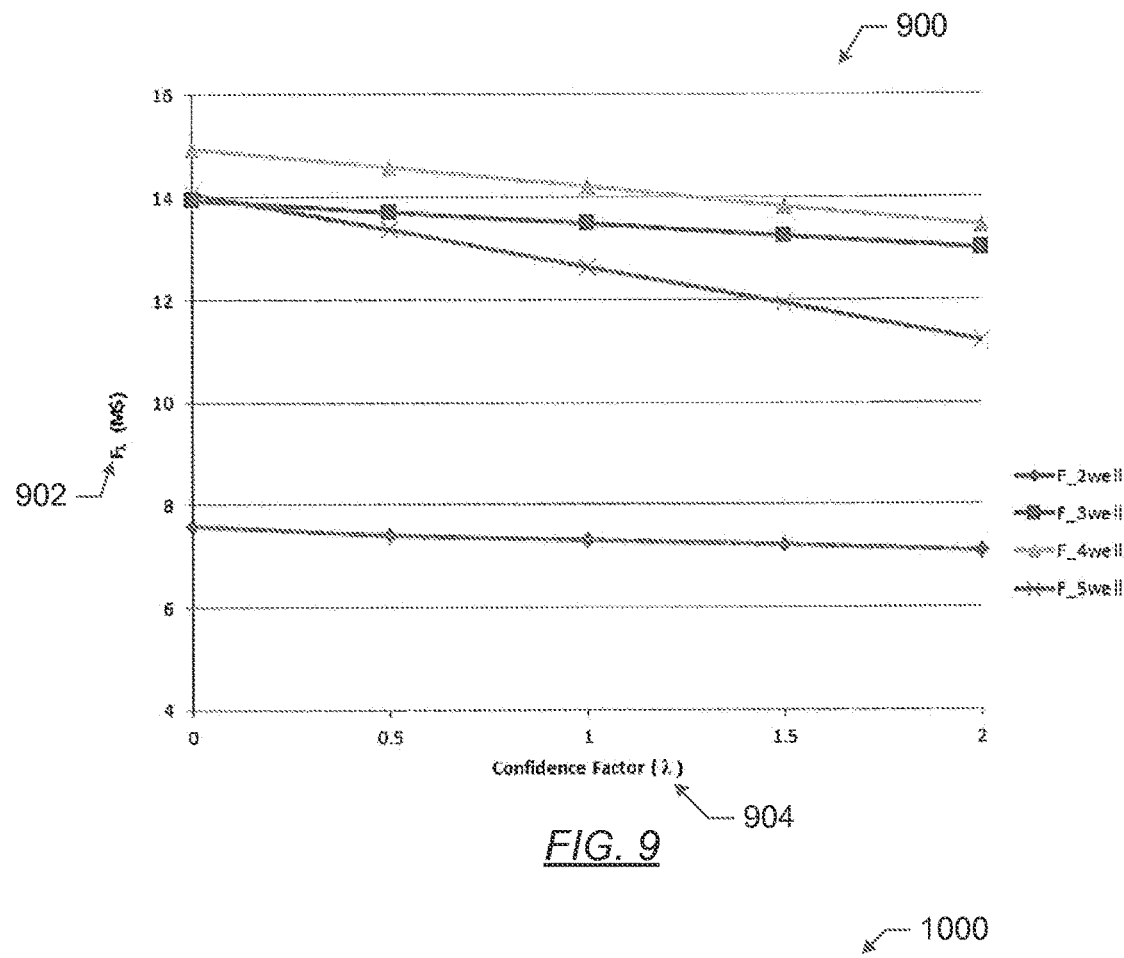

FIG. 9 shows an example graph (900) showing a possible variation of a composite objective function (902) with the desired risk aversion factor (i.e., confidence factor (904)) for a given number of wells in accordance with various implementations of multi-stage fracture design.

Figure 10:
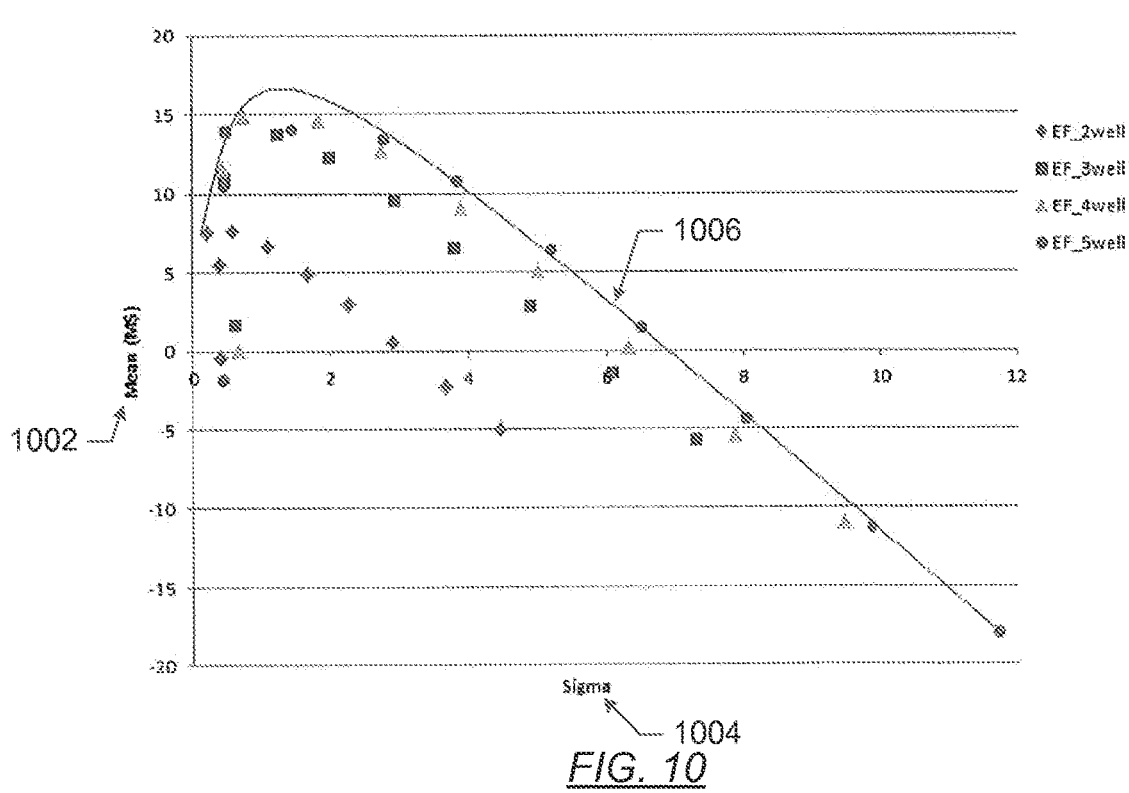

FIG. 10 shows an example graph (1000) plotting the mean value (1002) versus the standard deviation (i.e., sigma (1004)). The Efficient Frontier is shown as line (1006) that demarcates the outer convex hull over known samples. The graph shows how the selection of the number of wells in a sector may vary depending on the risk tolerance of the decision maker. In the example shown in FIG. 10, the line marks low risk (2-wells, blue diamond) to higher risk (5-wells, purple circle). The peak condition (4-wells, green triangle) indicates the most desirable solution.

In one or more embodiments, when the risk aversion factor is low (such as, for example, at zero), one objective may be equivalent to the mean value of the realizations. In addition, when the risk aversion factor is high, the objective may be equivalent to the mean value minus some multiple of the standard deviation of the realizations. Thus, the expected outcome may be high when the risk aversion factor is zero (e.g., a 50% likelihood in some implementations), while the expected value may be low at higher values of the risk aversion values, but with increasing certitude.

In one possible implementation, the uncertainty-based improvement procedure can be applied to a number of cases (wells in a sector), with a number of uncertain model parameters, each with a given probability distribution. In addition, microseismic data analysis may be used to provide distributions of fracture properties, including for example, the fracture type (including asymmetric cases) and fracture dimensions (e.g., height, length and width).

By way of another example, fracture geometry distributions from microseismic analysis may be used to establish single fracture models. The microseismic analysis may sometimes underestimate fracture half-lengths. That is, the lengths predicated may not be corroborated by other physical data sources. Regardless, the microseismic measurements may still be employed to improve the fracture models developed. Improved distributions may be used in the improvement framework to establish staging designs given the prevailing uncertainty in the system.

With reference to earlier example shown in FIGS. 9 and 10, the preceding case can be modified to account for a non-uniform fracture half-length distribution potentially obtained from microseismic investigation. Here, the 75, 125 and 175 feet fracture half-length models can be assigned weights of 0.375, 0.5 and 0.125, respectively, in accordance with an anticipated (triangular) distribution profile.

A change in the underlying fracture geometry distribution can alter the behavior of the profiles and the resulting efficient frontier. Thus, in or more embodiments, an accurate estimate of the underlying distributions may be obtained and used in the forecast improvement stage. Obtaining the accurate estimates may increase computational cost as each objective function evaluation may involve the evaluation of a number of realizations (each involving a possible simulation call). Further, the number of samples taken should be sufficient to provide an accurate measure of the mean and standard deviation of the outcomes or realizations due to the model parameters having an uncertain value in the problem. The samples may be evaluated in parallel during the adaptive proxy-based improvement procedure for expensive function improvement. Thus, multi-stage design improvement under uncertainty can be manageable and meaningful in an unconventional reservoir system with uncertainty and in the hydraulic fracture models employed.

As discussed above, performing the optimization portion for the control variable values that are binary variables may be by transforming the binary variables to continuous variables. Below is a discussion of performing the transformation and optimizing based on the transformation. In FIG. 2 above, the data repository may also include one or more transformation functions. In one or more embodiments, a transformation function defines a mapping between design patterns in binary space and integer values in integer space. In particular, a design pattern is a defined ordering of binary values whereby the position of each binary value in the defined ordering corresponds to a particular configurable element. In one or more embodiments, the transformation function provides a one to one mapping between design patterns and integer values. In other words, an integer value maps to a single design pattern and a design pattern maps to a single integer value in the transformation function.

Various transformation functions may exist. For example, one transformation function may be a binary transform that maps the binary value to the corresponding integer value (e.g., "0010" maps to "2"). Another transformation function may be a gray code transform. In a gray code transform, consecutive integer have design patterns that vary by a single bit. Other transformation functions may exist and be used without departing from the scope. In one or more embodiments, different transformation functions may map the same or different lengths of design patterns. For example, one transformation function may map design patterns having a length of six while another transformation function maps design patterns having a length of four.

Further, in FIG. 2 above, the oilfield design tool (206) may include additional functionality to obtain the configurable elements of the oilfield, generate a binary variable array based on at least some of the configurable elements, transform the binary variable array into integer variables, and issue a call to a solver to obtain a solution.

Figure 11:
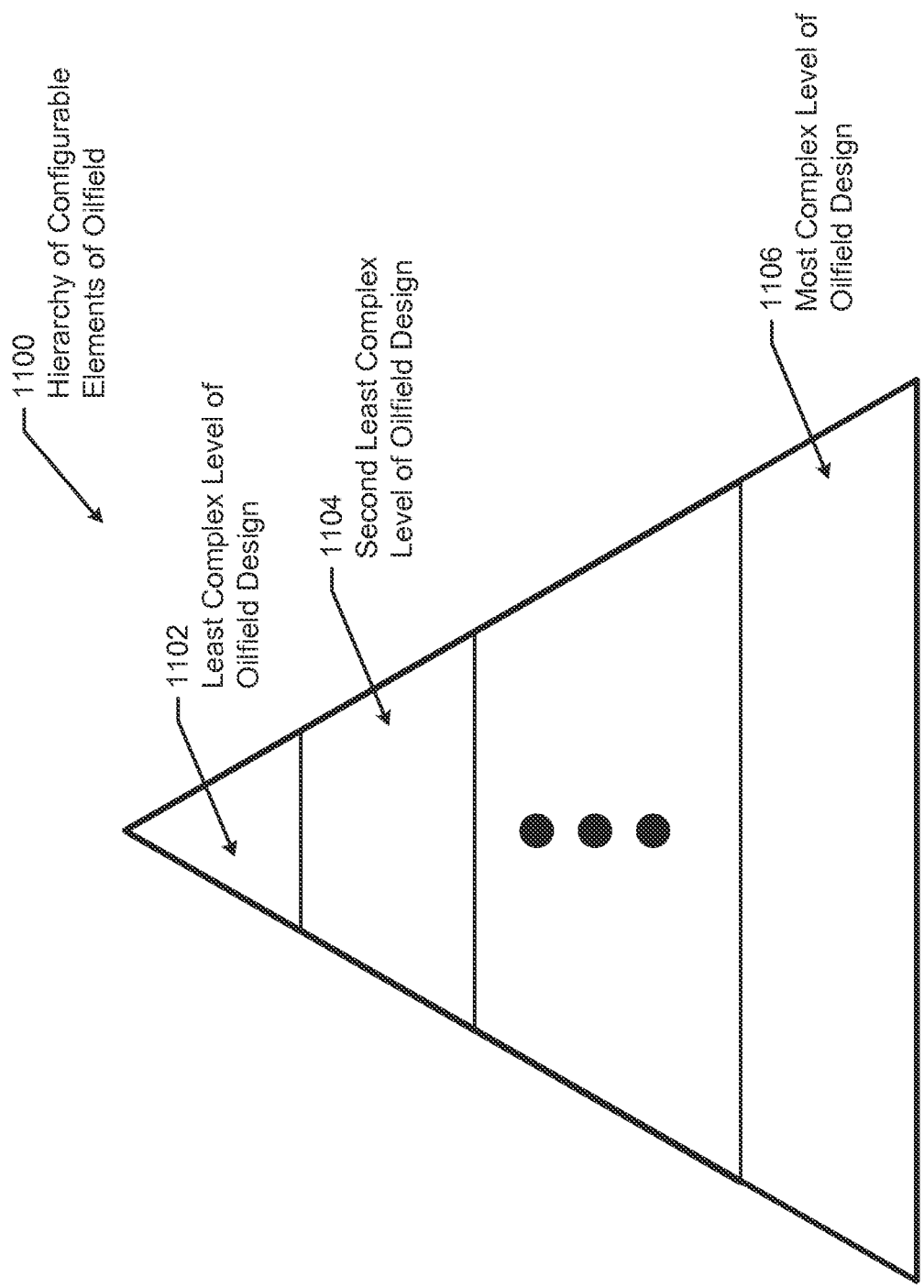
FIG. 11 show schematic diagrams in accordance with one or more embodiments.

In one or more embodiments, the oilfield design tool may include functionality to generate multiple solutions, whereby a solution exists for each of the various levels of complexity. FIG. 11 shows a hierarchy of configurable elements (1100) of the oilfield design. By considering the multiple solutions that allow for a different numbers of control variables to be considered for the oilfield design. Remaining control variables may be fixed at a predefined value or, in the case of a symmetric design, based on the values of defined controlled variables.

As shown in FIG. 11, the hierarchy of configurable elements (1100) includes a least complex level (1102), a second least complex level (1104), optionally various intermediate levels of complexity, and a most complex level (1106) of the oilfield design. The complexity level defines the number of control variables or configurable elements considered for the oilfield design, including choice of transformation. For example, the least complex level (1102) may be a univariate system where one type of configurable element is considered in the optimization problem. The second least complex level may have two or more types of configurable elements considered. In other words, the lower the complexity level and higher in the hierarchy, the more abstract the optimization problem and the greater the number of configurable elements that are managed as dependent design variables. The greater the complexity, the more configurable elements that may be adjusted to determine the optimal solution.

In one or more embodiments, by considering the various levels of complexity, one or more embodiments allow for managing a tradeoff between an amount of time to generate an optimal solution with the value of the objective function generated by the optimal solution as well as manage the complexity level of the solution. In general, the greater the number of configurable elements considered, the more time may be used to generate an optimal solution and the more complex the optimal solution may be to implement in practice.

While FIG. 11 shows a configuration of components, other configurations may be used without departing from the scope of the technology. For example, various components may be combined to create a single component. As another example, the functionality performed by a single component may be performed by two or more components.

FIGS. 12-15 show flowcharts in accordance with one or more embodiments. While the various blocks in these flowcharts are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt-driven in accordance with one or more embodiments. By way of an example, determination blocks may not require a processor to process an instruction unless an interrupt is received to signify that a condition exists in accordance with one or more embodiments. As another example, determination blocks may be performed by performing a test, such as checking a data value to test whether the value is consistent with the tested condition in accordance with one or more embodiments.

Figure 12:
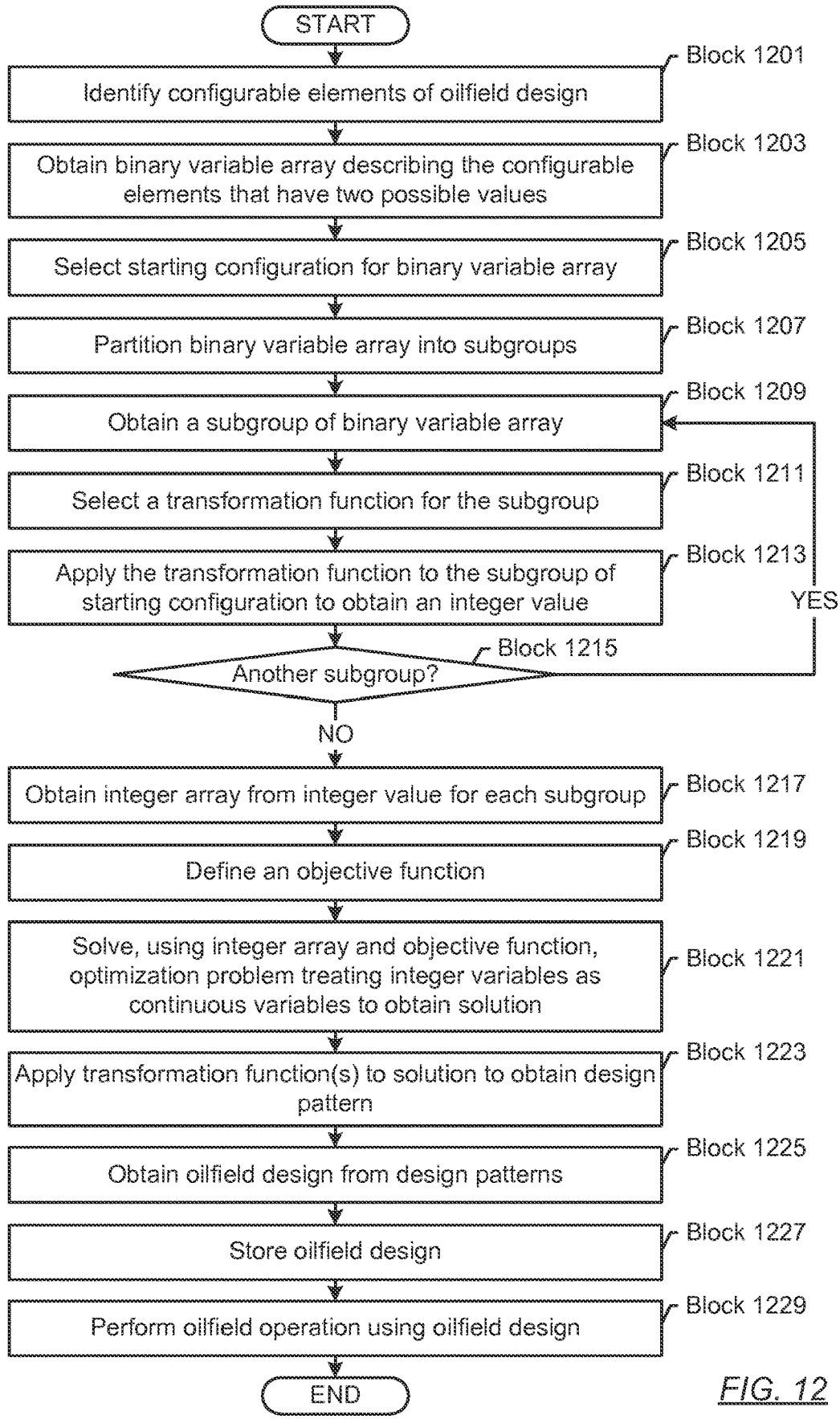
FIGS. 12-15 show flowcharts in accordance with one or more embodiments.

FIG. 12 shows a flowchart for management of an oilfield in accordance with one or more embodiments. In Block 1201, configurable elements of an oilfield design are identified in accordance with one or more embodiments. The configurable elements are defined based on the requirements for the oilfield design. For example, if the oilfield design is for an initial plan of the oilfield, the configurable elements may include position and direction of boreholes. In contrast, if the oilfield design is for performing fracturing operations on a reservoir with existing wells, the configurable elements may include locations of stages, number of fractures per stage, fluid properties, etc. By way of an example, a user using the oilfield design tool may specify which elements of the oilfield design are configurable. In some embodiments, possible configurable elements are specified by the oilfield design tool for any oilfield design. The possible configurable elements may be presented to the user who selects from the possible configurable elements or types of configurable elements. Prior to selection, a portion of the configurable elements that are inapplicable may be removed. In some embodiments, the types of configurable elements, such as fractures, stages, well sites, are identified. Based on the identified types of configurable elements, the configurable elements may be identified that may have the types, such as cells which may or may not have fractures, stages, and wellsites.

In Block 1203, a binary variable array describing the configurable elements that have two possible values is obtained in accordance with one or more embodiments. Each configurable element that has two possible values is represented as a binary variable. In other words, a binary variable in the binary variable array is a type of control variable that may have one of two values. In one or more embodiments, the configurable elements that may be represented using a binary variable are ordered into a binary variable array. The term array as used throughout this application refers to any data structure that may be used to directly or indirectly associate a value with a binary variable.

In Block 1205, a starting configuration for the binary variable array is selected in accordance with one or more embodiments. In one or more embodiments, the starting configuration has a defined value for each of the configurable elements. By way of an example, some of the configurable elements may be defined to have a value of zero, while other configurable elements may be defined to have a value of one in the starting configuration. The starting configuration may be a default configuration, an estimated configuration based on historical information associated with the oilfield or another oilfield, a configuration proposed by a user, another selected configuration, or a combination thereof.

In Block 1207, the binary variable array is partitioned into subgroups in accordance with one or more embodiments. In one or more embodiments, the partitioning separates portions of the binary variable array into distinct subgroups, whereby each binary variable is in a single subgroup. The ordering of binary variables in the binary variable array may be maintained when partitioning the binary variable array.

Further, the partitions may be the same size or a heterogeneous number of sizes. In one or more embodiments, the size of each subgroup is selected to reduce the number of binary variables in the subgroup that are manipulated by the sub-groupings, while ensuring that the number of resulting designs are not too low or too high to prevent the integer variable mapped to the subgroup to be treated continuously during the optimization procedure.

In Block 1209, a subgroup of the binary variable array is obtained in accordance with one or more embodiments. One or more embodiments process each subgroup of the binary variable array. The processing may be performed in serial, in order, in parallel, and/or in a random or other order.

In Block 1211, a transformation function is selected for the subgroup in accordance with one or more embodiments. The transformation function may be selected based on properties of the transformation function. For example, a Gray code has a Hamming distance of one, meaning that one bit value changes between two adjacent design patterns. In one or more embodiments, the same or different transformation functions may be selected for each subgroup. For example, a binary transformation function may be selected for one subgroup and a Gray Code transformation may be selected for another subgroup. Further, as discussed below in reference to FIG. 15, multiple transformation functions may be selected for each subgroup.

Continuing with FIG. 12, in Block 1213, the transformation function is applied to the subgroup of the starting configuration to obtain an integer value in accordance with one or more embodiments. In one or more embodiments, the portion of the starting configuration selected in Block 1205 that corresponds to the current subgroup is mapped through the transformation function to the integer value. Thus, the integer value corresponding to the starting configuration for the subgroup is obtained.

In Block 1215, a determination is made whether another unprocessed subgroup exists. If another unprocessed subgroup exists, then the next subgroup is processed.

In Block 1217, an integer array is obtained from the integer value for each subgroup in accordance with one or more embodiments. As discussed above, the use of the term array may refer to any data structure for associating the integer value with the corresponding subgroup. In other words, a data structure is populated with the corresponding integer values. The population of the data structure may be performed at the same time as obtaining the integer values for each subgroup.

In Block 1219, an objective function is defined in accordance with one or more embodiments. In one or more embodiments, the objective function is defined on the binary values. If the objective function is net present value, defining the objective function may be performed based on a predefined formula or template and the results of a simulation to determine the number of hydrocarbons. For example, equipment to drill wells and perform stimulation operations may have a predefined cost that is defined on per unit (e.g., well, stage, and/or other) basis. The predefined formula may account for such costs. Similarly, the simulation may provide the expected hydrocarbons produced, which has an expected gross profit. Thus, the objective function may be defined that accounts for the various costs and the expected gross profit. Various techniques may be performed to define an objective function that are dependent on the type of objective function.

In Block 1221, using the integer array and the objective function, the optimization problem is solved by treating the integer variables as continuous variables to obtain a solution. In other words, variables in the optimization problem are treated as continuous variables to solve the optimization problem. In some embodiments, the optimization problem may be solved using additional variables representing configurable elements that have more than two possible values. Solving the optimization problem is discussed below and in reference to FIG. 13.

In some embodiments, the result of solving the optimization problem is a solution that provides an integer value for each integer variable in the integer array. In such embodiments, a transformation function is applied to each integer variable to obtain the corresponding design pattern in Block 1223. In other words, for each subgroup, the selected transformation function for the subgroup in Block 1211 is applied to the integer value for the subgroup in the solution to obtain the corresponding design pattern that maps to the integer value.

In other embodiments, the solution may be the design pattern for each subgroup. In such embodiments, no transformation function is applied at this stage as the design pattern is already obtained.

The set of design patterns for the subgroups provides a value for each binary variable, and subsequently for each configurable element of the oilfield design. Accordingly, in Block 1225, an oilfield design is obtained from the design patterns in accordance with one or more embodiments. The oilfield design may be the group of design patterns. In other embodiments, the oilfield design may be a translation of the design patterns into a specification for oilfield equipment. For example, if the configurable elements are defined at the cell level, obtaining the oilfield design may include translating the values at the particular cells to a definition of locations in which drilling operations or simulation operations are to occur. For example, rather than describing each cell and whether each cell has a fracture, the oilfield design may specify the measured depths along the trajectory of the wellbore that have a fracture in the solution. In such a scenario, a mapping function may be accessed to determine which cells in the model correspond to the trajectory of the wellbore in order to obtain the oilfield design. Other techniques for obtaining the oilfield design may be used without departing from the scope.

In one or more embodiments, an oilfield operation is performed using the oilfield design in Block 1227. In one or more embodiments, the equipment controller may send a control signal to the oilfield equipment located at the oilfield. The control signal may include the oilfield design or actions to perform based on the oilfield design. In response, the oilfield equipment may perform the operations specified by the oilfield design by physically drilling wells or performing the various stimulation operations. The oilfield operations may or may not be performed with human interaction, such as to control or watch the equipment.

In one or more embodiments, at various stages of the method, the oilfield design tool may interact with the user through the user interface to obtain the solution, obtain the oilfield design and control the oilfield equipment. For example, the oilfield design tool may present metrics regarding solving the optimization problem, the solution, the oilfield design, other information, or any combination thereof and the user may submit commands to control the optimization and the oilfield design. For example, the user may decide that the current solution is the most optimal solution given the number of iterations performed, set a maximum number of iterations (e.g., by defining the maximum number of iterations, specifying a maximum execution time, or performing any other such action), and approve or disapprove of the oilfield design.

Figure 13:
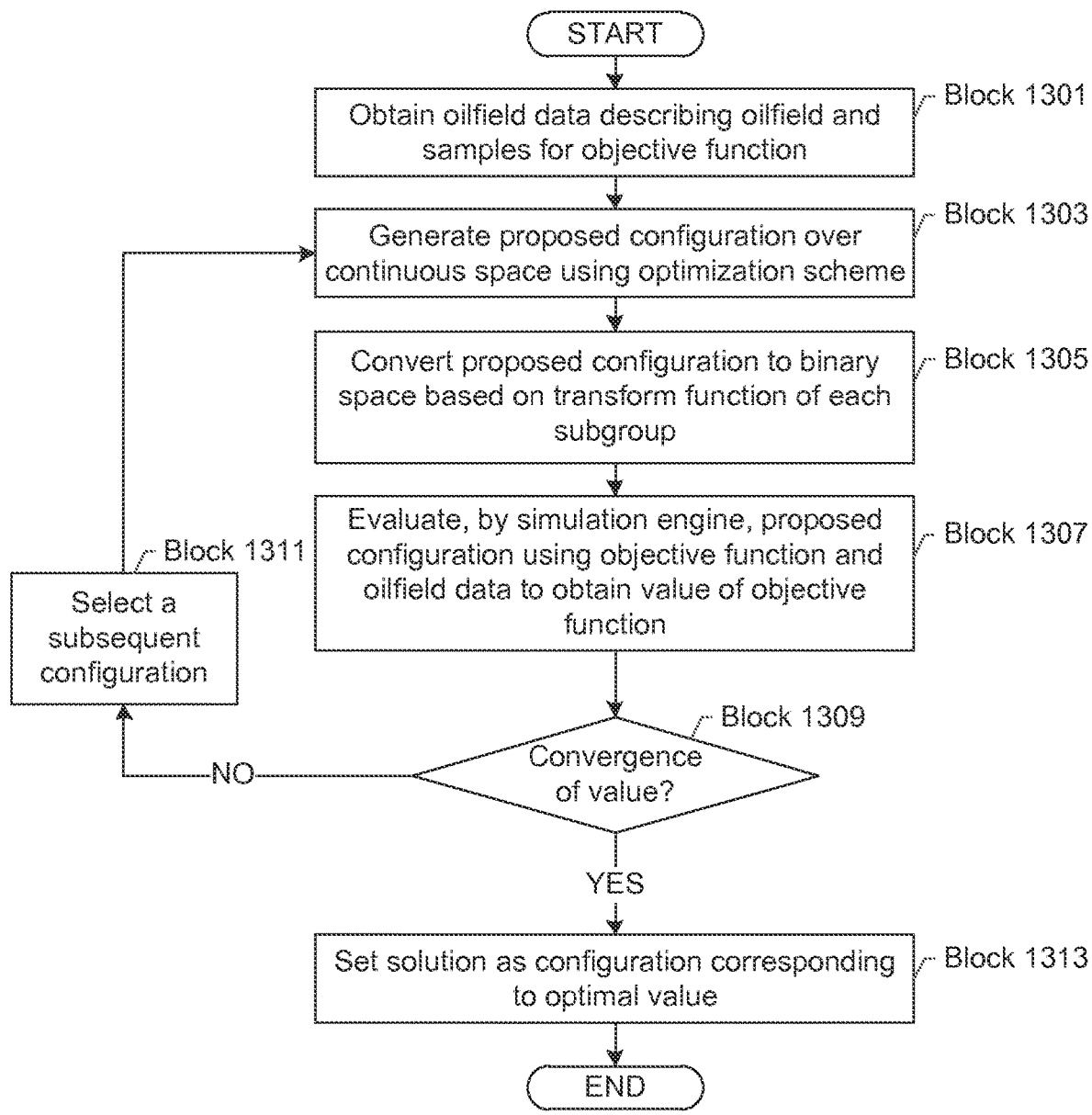

Turning to FIG. 13, FIG. 13 shows a flowchart for solving the optimization problem in accordance with one or more embodiments. In Block 1301, oilfield data describing the oilfield and samples for the objective function are obtained. As discussed above, the oilfield data may be obtained using data acquisition tools in the oilfield data. In particular, sensors located in the oilfield may detect various physical properties of the oilfield and transmit information describing the detected physical properties to the field management tool. In some embodiments, rather than or in addition to obtaining the oilfield data using data acquisition tools, oilfield data may be obtained from a data repository. Further, the oilfield data that is obtained may include or be used to generate a model of the oilfield, including a reservoir model. In one or more embodiments, the samples correspond to a set of possible configurations for the oilfield design. An initial set of samples may be defined by a user or generated by the field management tool.

In Block 1303, a proposed configuration is generated over continuous space using an optimization scheme. In other words, the integer variables in the samples are treated as continuous variables when applying the optimization scheme, which may be a direct or approximation-based optimization scheme. One or more of the samples may be a starting configuration selected in FIG. 12. From the samples, a proxy model may be constructed that represents an approximate model of available configurations. For example, the proxy model may be constructed using a neural network or radial basis function proxy scheme. In a proxy-based optimization scheme an initial collection of samples (design configurations along with their associated objective values) are used to construct an approximation model. The samples can be specified randomly, with uniform sampling, design of experiments, Latin hypercube sampling or some other heuristic scheme, but they are integer feasible. The approximation method may include neural networks, kriging, radial basis function or some other method. It serves to provide an analytical representation of the problem of interest. The approximation model is optimized in place of the expensive simulation-based process over continuous space. The proposed solution is then evaluated (with rounding to ensure integrality requirements where desired) by calling the actual simulation model. If the convergence is not met, the new sample is added to the data set and the process repeats. Such proxy (or surrogate) based methods are well established for managing expensive simulation-based optimization problems.

In Block 1305, the proposed configuration is converted to binary space based on the transform function applied to each subgroup. In one or more embodiments, each subgroup has a corresponding continuous variable in the proposed configuration. Additional continuous variables may exist in the proposed configuration that represent configurable elements having possible continuous values and/or integer values. The continuous variables that represent configurations having integer values and subgroups are converted into integer variables, such as by rounding (e.g., rounding up, down, or to the closest integer). For integer values representing subgroups, the integer values are transformed according to the transformation function selected for the subgroup into a design pattern for the subgroup. Thus, the result of Block 1305 may be a proposed configuration having binary values, integer values, continuous values, or any combination thereof.

In Block 1307, the simulation engine may evaluate the proposed configuration resulting from Block 1305 using the objective function and the oilfield data to obtain a value of the objective function. For example, simulations may be performed on the oilfield using the oilfield data to determine the amount of hydrocarbons extracted based on the configuration. Data describing the cost of the configuration and the economic benefit of the amount of hydrocarbons produced may be used to calculate the value of the objective function. Because various different objective functions may be defined, the technique for calculating the value of the objective function may vary depending on the objective function and are included herein without departing from the scope of the claims.

In Block 1309, a determination is made whether embodiments converge on a value in accordance with one or more embodiments. In one or more embodiments, the values of previous values of the objective function from previous iterations may be compared to determine whether convergence of the values exist.

If convergence does not exist, then another iteration is performed. Specifically, the next iteration is performed by selecting a subsequent configuration in Block 1311 and repeating the process starting with Block 1303 using the various identified samples. In one or more embodiments, the selection of the subsequent configuration may be performed in integer space rather than binary space. The selection of new design candidates is established by the optimization method employed. For example, a derivative-free simplex method will perturb the incumbent polytope to provide a new test condition. A gradient-based method will attempt a line search along a descent direction. For approximation-based schemes, any solver can be applied on the analytical closed-form representation and the best solution established is often used as the new candidate solution. Note that any number of new candidate solutions could be tested at each iteration depending on the algorithm and computational cost involved.

If convergence exists, then the solution is set as the configuration corresponding to the optimal value in Block 1313. In other words, if the objective function is a cost function, then the solution is the configuration corresponding to the minimal value. If the objective function is a utility function, then the solution is the configuration corresponding to the maximal value. In some embodiments, limits may be placed on the number of iterations. In such a scenario, the optimal value may be the optimal identified value.

Figure 14:
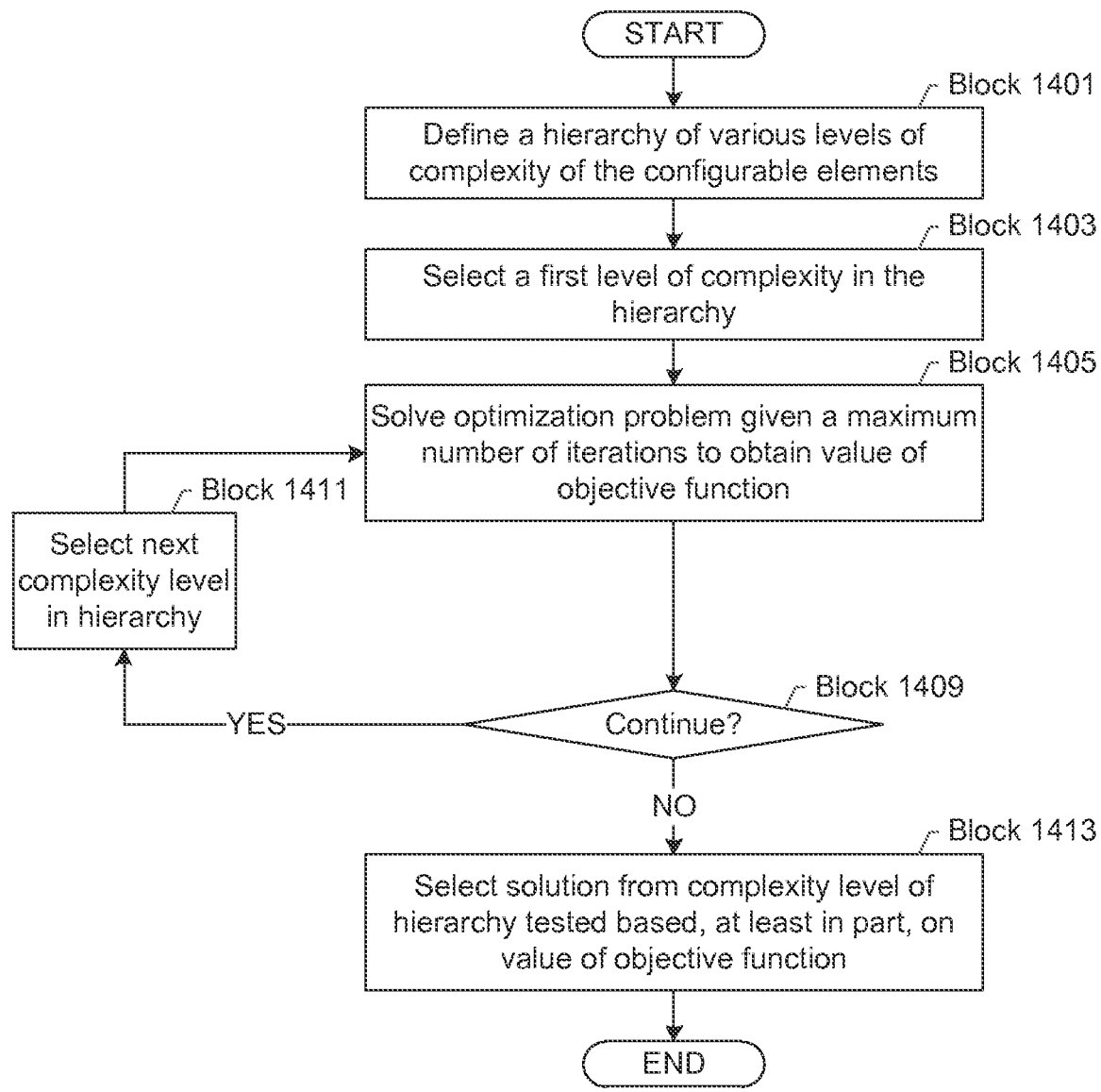

As discussed above with reference to FIG. 11, different solutions may have different levels of complexity to implement. For example, the greater the number of configurable elements that may be independently configured, the more difficult the oilfield design is to implement and the more time may be required to identify the optimal solution. One or more embodiments may be used to manage the tradeoff between complexity and optimal value by solving the optimization problem for each of various levels of complexity. FIG. 14 shows a flowchart for generating and selecting a solution that accounts for various levels of complexity.

In Block 1401, a hierarchy of the various levels of complexity of the configurable elements is defined. The hierarchy may be defined using user interaction. For example, a user may specify, for each level of complexity, which configurable elements are static and which configurable elements may change. In other embodiments, the field management tool may automatically define the hierarchy, such as by assuming a uniform configuration throughout the oilfield to a less uniform configuration, to an asymmetric configuration.

In Block 1403, a first level of complexity is selected in the hierarchy in accordance with one or more embodiments. In one or more embodiments, the least complex level may be initially selected. However, any level of complexity may be initially selected without departing from the scope.

In Block 1405, the optimization problem is solved given a maximum number of iterations to obtain a value for the objective function. Solving the optimization problem for the level of complexity may be performed by performing Blocks 1201-1221 of FIG. 12 for the level of complexity. In other words, the binary variable array is defined based on the level of complexity as to what variables have a constant value or an equal value to other variables, or indeed, are specified as dependent variables. Further, in one or more embodiments, the solution may be limited by a number of iterations. By limiting the number of iterations, one or more embodiments may balance the achievement of an optimal solution with the limits of time to determine the optimal solution.

In Block 1409, a determination is made whether to continue in accordance with one or more embodiments. In some embodiments, rather than performing each level of the hierarchy, the field management tool may stop. For example, if the optimal value of the objective function for several levels of the hierarchy converges, a determination may be made that any additional benefit gained by a more complex solution may be outweighed by the complexity to implement the solution. In other embodiments, engineer requirements on the oilfield design or the maximum amount of time may result in a determination to stop at the current level of the hierarchy. If a determination is made to continue, then in Block 1411, the next complexity level of the hierarchy is obtained and the optimization problem is solved for the next complex level of the hierarchy.

If a determination is made not to continue, a solution is selected from the complexity levels of the hierarchy tested, based at least in part, on the value of the objective function. In other words, the optimal solution corresponding to a level in the hierarchy tested is selected. Selecting the optimal solution may be performed according to the optimal values. Additional factors, such as the complexity level to implement the solution may also factor into which level of the hierarchy is selected. For example, if the amount of gain between a non-uniform configuration and a uniform configuration is negligible, then a uniform configuration may be selected based on being easier to implement. By way of another example, if a non-uniform configuration has a vastly increased optimal value over the uniform configuration, then the non-uniform configuration may be selected. One or more embodiments may implement the selected solution by performing Blocks 423-427 for the selected solution.

Returning to Block 1303 of FIG. 13, in order to determine a proposed configuration, multiple samples may be used. In some embodiments, a local optimal value may be generated that is not reflective of the global optimal value. In some embodiments, the time to determine the optimal value may be substantial. One or more embodiments may, in parallel, solve the optimization problem by applying different transformation functions to the same subgroup. By applying different transformation functions, a time to determine the optimal value may be reduced and the system may not settle on a local optimal value in some embodiments.

Figure 15:
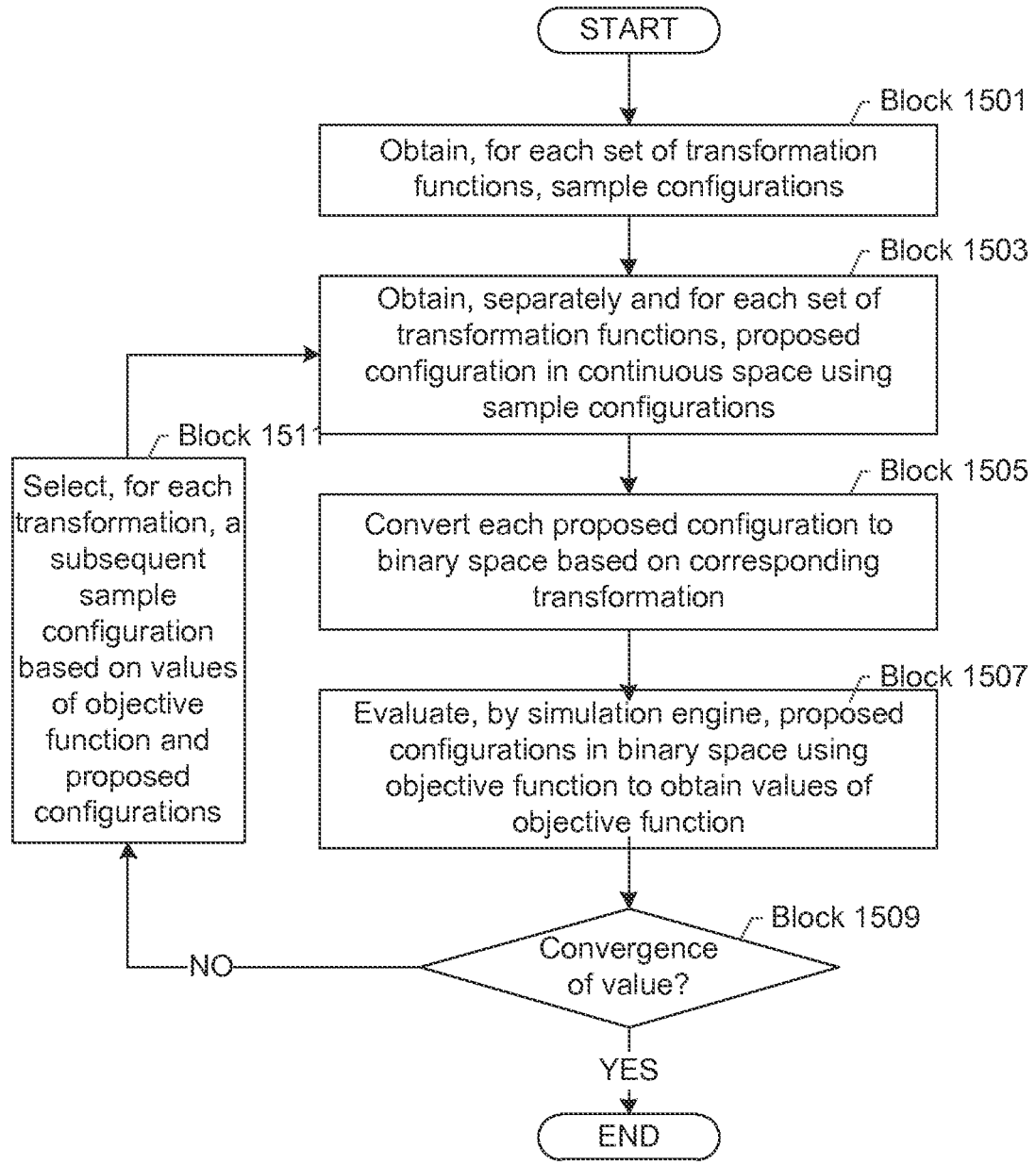

FIG. 15 shows a flowchart for using different transformation functions that are applied to the same subgroup. The processing for different transformations functions in FIG. 15 may be performed in parallel by multiple threads, multiple computing processors and/or processor cores.

In one or more embodiments, the Blocks shown in FIG. 15 may be performed instead of FIG. 13 in terms of solving the optimization problem. Prior to performing the various operations of FIG. 15, Blocks 1201-1207 may be performed. Further, Blocks 1209-1219 may be performed multiple times, one time for each set of one or more transformation functions applied to the various subgroups. In other words, Blocks 1209-1219 may be performed once for a first set of one or more transformation functions to apply to the subgroups. Concurrently or consecutively, Blocks 1209-1219 may be performed again for a second set of one or more transformation functions to apply to the subgroups. The process may repeat for the number of times that a set of one or more transformation functions is applied to the subgroups.

Returning to FIG. 15, in Block 1501, sample configurations are obtained for each set of transformation functions. In one or more embodiments, obtaining the sample configurations for a set of one or more transformation functions may be performed independently of obtaining sample configurations for other transformation functions. Further, obtaining the sample configurations for a particular set of transformation functions may be performed as discussed above with reference to Block 1301.

In Block 1503, separately and for each set of transformation functions, a proposed configuration is obtained in continuous space using the sample configurations. In one or more embodiments, obtaining the proposed configuration for a set of one or more transformation functions may be performed independently of obtaining the proposed configuration for other transformation functions. Further, obtaining the sample proposed configuration for a particular set of transformation functions may be performed as discussed above with reference to Block 1303.

In Block 1505, each proposed configuration is converted to binary space based on the corresponding transformation. Converting the proposed configuration may be performed independently for each transformation function and may be performed as discussed above with reference to Block 1305.

In Block 1507, the proposed configurations are evaluated in binary space using the objective function to obtain values of the objective function. Block 1507 may be performed as discussed above with reference to Block 1307 and may be performed independently for each set of one or more transformation functions.

In Block 1509, a determination is made whether the values converge in accordance with one or more embodiments. In particular, a determination is made whether the values obtained by the different transformation functions converge both with respect to each other, as well as with respect to prior iterations in the course of solving the optimization problem.

If a convergence does not exist, then, for each set of one or more transformation functions, a subsequent configuration is selected based on the values of the objective function and proposed configurations of each transformation in Block 1511. In one or more embodiments, the proposed configurations are cross-pollinated across sets of transformation functions. In particular, the proposed configuration used by one set of transformation functions is used as a sample in the other set of transformation functions for the next iteration. To use a proposed configuration for a first set of transformation functions as a sample for a second set of transformation functions, the following operations may be performed. The proposed configuration is transformed into binary space using the first set of transformation functions. In other words, the design patterns for the proposed configurations are obtained. Next, the design patterns are mapped according to the second set of transformation functions into integer space. Thus, the result is the proposed configuration from the first set of transformation functions being mapped to the corresponding values of the second set of transformation functions. Each set of transformation functions may then create additional samples and generate a new proposed configuration starting with Block 1503.

Although FIGS. 12-15 are shown and described separately, various portions of FIGS. 12-15 may be combined. For example, performing the processing according to the hierarchy as shown in FIG. 14 may be combined with the cross-pollination between the sets of transformation functions in FIG. 15. In such a scenario, for one or more levels of the hierarchy, multiple sets of transformation functions may be processed.

FIGS. 16-22 show examples in accordance with one or more embodiments. The following example is for explanatory purposes and not intended to limit the scope.

Figure 16:
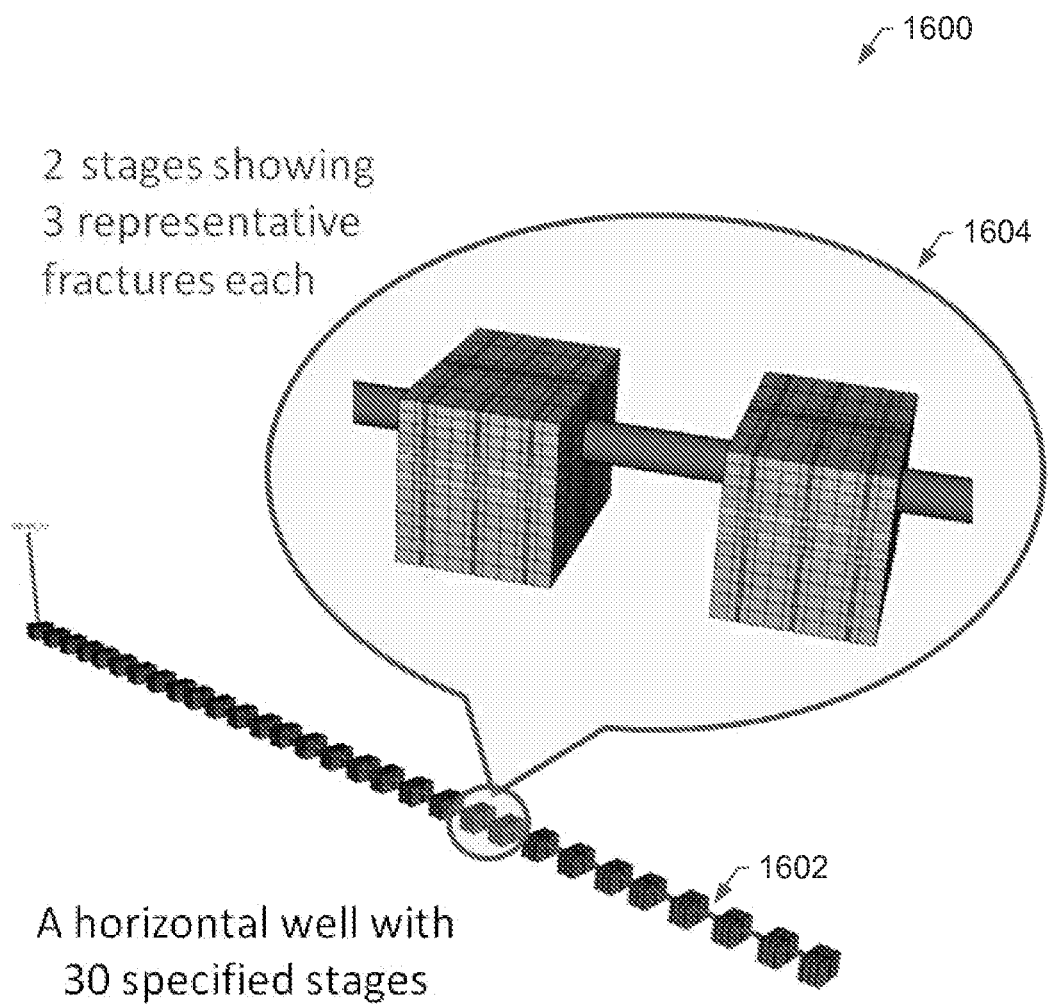

FIG. 16 shows an example simulation model (1600) of a horizontal well (1602) with thirty stages (shown as boxes in FIG. 16). Each stage corresponds to a section of the wellbore in which a collection of fracturing operations are to be performed. Two of the stages are shown in the expanded view (1604). As shown in FIG. 16, each of the two stages in the expanded view (1604) has three fractures. Fractures may be defined in the simulation model using a local grid refinement (LGR) procedure. The LGR procedure increases resolution over a specific volume in the simulation grid by increasing the number of cells in the simulation grid over a defined volume. Thus, the static properties of the grid cells within the defined volume may be adjusted according to need, while also ensuring the stability of the numerical simulation with the property changes introduced. The properties of the cells in an LGR block are updated according to the fracture model developed for each representative fracture length. The properties can be introduced in a number of ways, either directly into the primary simulation model data file or they may be included as separate associated LGR definition files (e.g., LGRDEF) that define data pertaining to the LGR, such as those concerning the wellbore, grid indices, the skin factor, permeability, porosity, water saturation, net-to-gross ratio, pore volume, pressure, and other properties to introduce representative fractures into the simulation model.

In the simulation model, a fracture may be defined at fixed locations along any well in the grid. The LGR mechanism may be used to define a higher conductivity in the neighboring cells at a particular location in a well to account for the higher connection to the rock matrix with the consequence of increasing the fluid production at that point. Thus, each LGR block may represent a simple planar fracture according to the properties adopted (i.e., LGRDEF). Also, a single fracture may appear in a single block of some predefined width (e.g., fifty ft.) to represent the physical distance resulting between fractures during the stimulation operations. As the number of possible locations for fractures is discrete, a simulation based on a binary optimization problem arises.

The multi-staging fracture design problem may include establishing the number and location of stages along each well in a sector. In one or more embodiments, the number of wells, the fracture half-length, and the number of fractures per stage, may be given a priori for each case investigated.

The binary optimization problem is directed to specifying of individual fractures. In the binary optimization problem, a value of either 0 or 1 is established for each variable ($y_i$) such that the objective function of interest $F(Y)$ is maximized, where Y represents the vector of binary variables that indicate the placement (or otherwise) of a fracture in a given position in the model.

The total number of possible solutions for the unconstrained problem is $2^n$, where n is the dimensionality of the binary system, thereby creating an NP-hard problem. The solution space may be reduced somewhat with the constraint describing the fixed number of fractures per stage; however, the problem complexity remains. Additional complexity is introduced by the fact that each objective function evaluation may involve a computationally demanding (i.e., time consuming) simulation evaluation. The complexity associated with binary optimization may be addressed using the various disclosures herein, while an adaptive proxy optimization scheme may be employed to manage the expensive simulation-based optimization problem.

One or more embodiments described herein are devised as a way to manage the complexity associated with expensive simulation-based binary optimization problems. The method aims to transform the binary problem into a continuous problem of lower dimensionality.

FIG. 17 shows an example of the binary optimization problem schema in accordance with one or more embodiments. As shown in FIG. 17, a binary variable array (1700) may be defined as a row of n cells (labelled $c_1$(1702) ... $c_n$(1704)). Each cell corresponds to a particular location in a wellbore and a particular control variable, such as a fracture or a state. As shown in FIG. 17, each cell may include a value of 0 or 1, and, thereby defines a starting configuration.

One or more embodiments described herein partition the binary variable array into a number of partitions. FIG. 18 shows an example of the binary variable array (1800) as partitioned into multiple partitions. Although FIG. 18 shows the binary variable array being partitioned into equal sizes, the partitions may be heterogeneous sizes. Each sub-group of binary variables b may be manipulated collectively using a transformation function.

FIG. 19 shows a table (1900) of two example transformation functions. In particular, FIG. 19 shows a binary transformation function (1902) and a gray transformation function (1904). As shown in FIG. 19, each transformation functions map a design pattern $v_j$ in binary space to an integer value (e.g., index) in accordance with one or more embodiments. In other words, a design pattern of "0100" using the binary transformation function maps to the integer value of four and to the integer value of seven using the gray transformation function. The corresponding integer values may be treated as continuous when generating a proposed solution to solve the optimization problem.

Thus, consider the scenario in which two transformation functions are applied to the same partition to solve the binary optimization problem, such as using the technique discussed above with reference to FIG. 15. If the result of the performing the first optimization scheme is a proposed configuration of 9 using the binary transformation function, then 9 is mapped back to "1001" using the binary transformation function. The pattern "1001" is then mapped in the gray transformation function to give an integer value 14. Thus, in the example, the integer value of 14 may be used (together with its associated objective value) as a sample when applying the optimization scheme for the gray transformation function as discussed in Block 1303 of FIG. 13, and vice versa, for the solution established using the gray transformation procedure.

Figure 20:
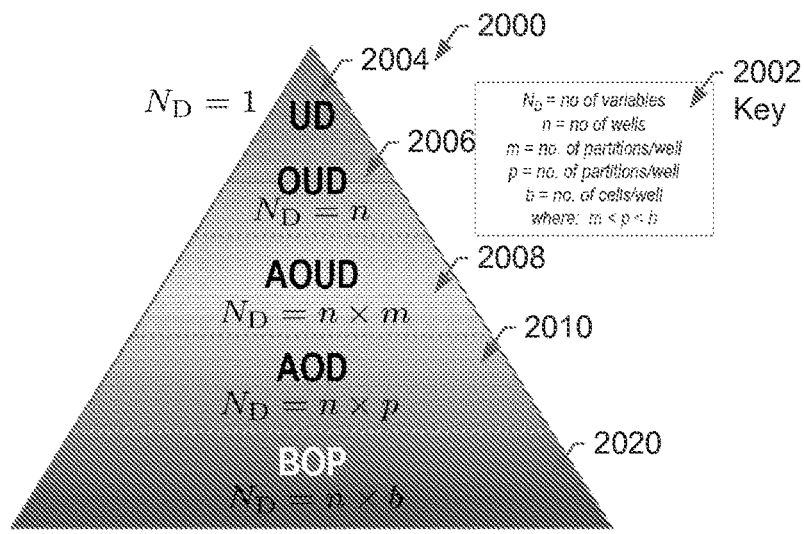

As discussed above, one or more embodiments may be applied in a hierarchical manner to efficiently manage the multi-stage fracture design optimization problem depending on the geo-mechanical complexity of the simulation model. FIG. 20 shows an example of a complexity hierarchy (2000) in accordance with one or more embodiments. The key (2002) may be used to interpret the variables shown in FIG. 20. As shown in FIG. 20, the highest level of abstraction (2004) is a uniform distribution (UD) of stages over N wells with a single variable. The optimal uniform distribution (OUD) (2006) refines the process with one variable assigned to each well. The abstracted optimal uniform distribution (AOUD) (2008) further refines the process by partitioning the wells into m blocks each, while retaining a uniform distribution. A more general abstraction, with p blocks in each well (where p>m), permits any transform to be adopted using the AOD scheme (2010). The original binary optimization problem (BOP) (2020) of dimensionality n is described at the lowest level.

The hierarchical approach may reduce the computational complexity when the prevailing heterogeneity is low, both horizontally and laterally, along the wells, while also permitting a solution when the heterogeneity is high. However, given that the model complexity may not be known a priori, optimization may commence downwards from the least complex level to the most complex level.

FIGS. 21.1-21.5 are examples showing three example wellbores configured according to a result of the complexity level of the complexity hierarchy shown in the example of FIG. 20. In FIGS. 21.1-21.5, horizontal lines are wells and vertical lines are fractures. FIG. 21.1 shows an example uniform distribution (2102) in accordance with one or more embodiments. For FIG. 21.1, consider a reservoir model in which the in situ reservoir properties are homogeneous. In such a scenario, one design configuration may be applied to the wells as there is no horizontal (sector wide) or lateral (along the well) variation. For the optimization problem, a single variable x may be specified with the constraint $x=x_j$, for j=1:::N (where N is the number of wells). The transformation function (T) is based on the uniform distribution of a given number of fractures that meet the fractures per stage (nfps) requirement. Here, the index corresponds to the number of stages and is bound $[1, x_{max\ j}]$, where the maximum number of stages $(x_{max\ j})$ is given by nc/nfps, where nc is the number of cells in the well. Evidently, $x_{max\ j}$ is a fully fractured well, while lower index values describe uniform distributions of lower density according to the mapping scheme employed.

FIG. 21.2 show an example of the optimal uniform distribution (2104). In the example, consider a model in which substantial horizontal heterogeneity exists, but little or no lateral heterogeneity. In this case, an optimal uniform distribution may be made with one variable assigned to each well, with a uniformly distributed transformation model as described with respect to FIG. 21.1.

FIG. 21.3 shows an example of the abstracted optimal uniform distribution (AOUD) (2106). For the example, consider a model in which substantial horizontal and lateral variation exists. In such a scenario, a greater number of blocks may be defined for the j-th well by suitably selecting $b_j$ (the partition size) The optimization problem is defined as for OUD, but with nv>N (where N indicates the number of wells and nv is the number of effective variables).

FIG. 21.4 shows an example of an abstracted optimal distribution (AOD) (2108) in accordance with one or more embodiments. A uniformly distributed transformation may not be sufficient for a model that is substantially heterogeneous. In such a scenario, a non-uniform optimal distribution may be used with a binary transform decimated to meet the fracture per stage requirement. Greater flexibility may be achieved using the AOD scheme, but at a cost of increasing the number of variables given the shorter choice of block length ($b_j$) in each well. The scheme shown in FIG. 21.4 may permit asymmetric solutions in each partition.

FIG. 21.5 shows an example of the abstracted optimal distribution (AOD) (2110) in accordance with one or more embodiments. In the scheme shown in FIG. 21.5, no constraints are placed on the well. The optimization process is completely relaxed if the fracture per stage requirement is lifted. In such a scenario, each variable has a wider index range that permits possible designs as no patterns are decimated.

Figure 22:
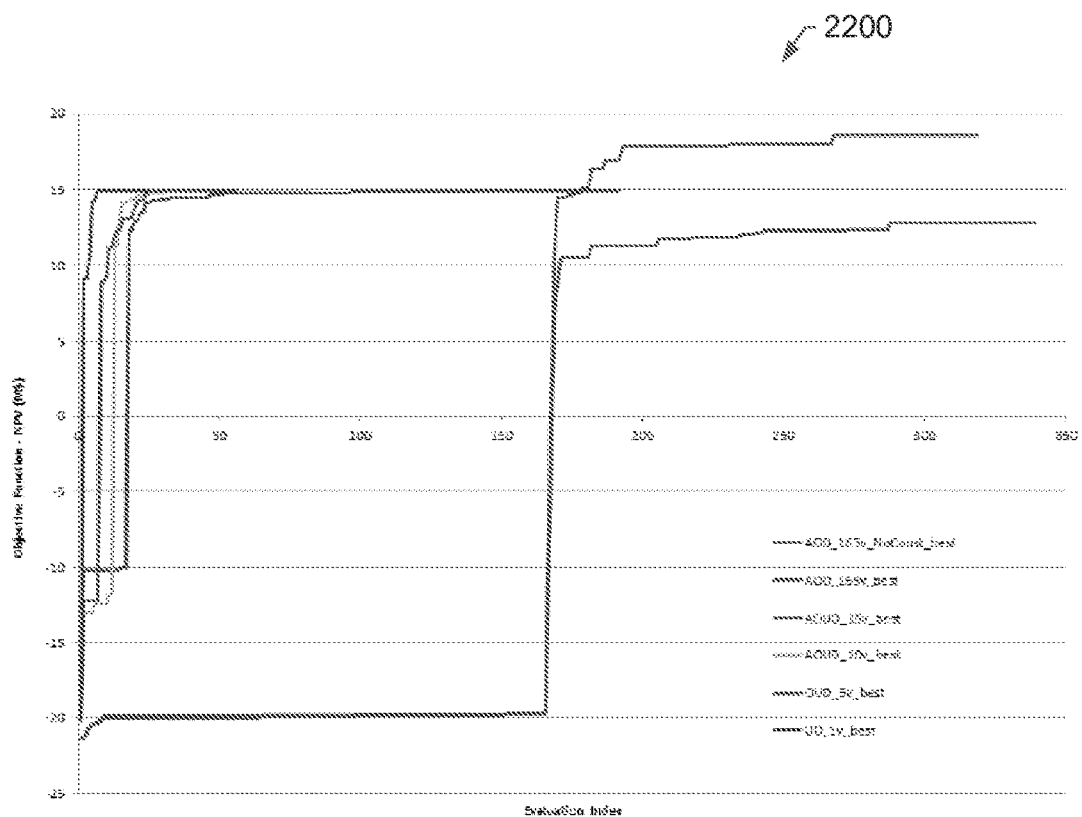

FIG. 22 shows an example graph (2200) of the optimization performance profiles for each complexity level of the complexity hierarchy in accordance with one or more embodiments. Table 2 below provides the values corresponding to the example graph in FIG. 22.

TABLE 2

| Scheme | Dims | w1 | w2 | w3 | w4 | w5 | Total Fracs | fevals | Time (hrs) | $F_{opt}$ (M$) |
|---|---|---|---|---|---|---|---|---|---|---|
| Design Constraint (3 FPS) | | | | | | | | | | |
| UD | 1 | 60 | 60 | 60 | 60 | 60 | 300 | 25 | 16.4 | 14.9822 |
| OUD | 5 | 60 | 63 | 57 | 60 | 60 | 300 | 56 | 35.8 | 14.9273 |
| AOUD | 10 | 66 | 63 | 60 | 63 | 63 | 315 | 82 | 47.3 | 14.9255 |
| AOUD | 15 | 60 | 60 | 63 | 60 | 60 | 303 | 192 | 110.1 | 14.9390 |
| AOD | 165 | 165 | 69 | 60 | 69 | 57 | 324 | 339 | 172.6 | 12.7863 |
| No Design Constraints | | | | | | | | | | |
| AOD | 165 | 68 | 68 | 68 | 59 | 75 | 338 | 319 | 172.0 | 18.5699 |

In particular, Table 2 and FIG. 22 shows an example of optimizing a 5-well model with a fracture half-length of 125 ft. The underlying binary system has n=990 binary variables with nc=198 cells per well. Results are shown for UD, OUD, AOUD and AOD schemes. For each scheme, the problem dimensionality, the number of fractures by well and the total fractures placed are given. The number of function evaluations and time required to reach the solution NPV are also given.

The UD solution results from a univariate optimization process that uses 25 function evaluations. A design comprising 20 uniformly distributed stages (with 60 fractures) over each well is established. The OUD solution entails a 5-variable problems and identifies the optimal uniform distribution per well. In this example, the OUD solution is marginally lower than the UD solution, indicating that there is not substantial heterogeneity in the model. Regardless, the OUD solution may be further refined with additional partitions assigned per well. The AOUD problem with 2 or 3 partitions yields problems of 10 and 15 variables, respectively, in the example. As shown, as the model dimensionality increases, the number of function evaluations required to reach a solution may also increase. However, in the present example, the results do not change appreciably from the UD solution.

The AOD scheme permits an even greater flexibility (if warranted) with smaller partitions. A problem with 165 variables results with a block length of 6 bits and uses over 300 simulation evaluations. Due to the increased complexity of the problem, a solution of lower value may exist. The lower value may be due to a limitation of the adaptive procedure that can give rise to local entrapment when the function is highly multi-modal. A re-start procedure may be employed to overcome this limitation to some extent.

Lastly, as shown in the graph, the AOD scheme, again with 165 variables, is demonstrated without the imposition of the 3 fracture per stage design requirement. Notably, the relaxed problem yields a higher objective function value (nearly 24% greater than the best solution established by the UD scheme).

As discussed above, FIGS. 16-22 are examples. The configurations and results may vary without departing from the scope of one or more embodiments.

Figure 23:
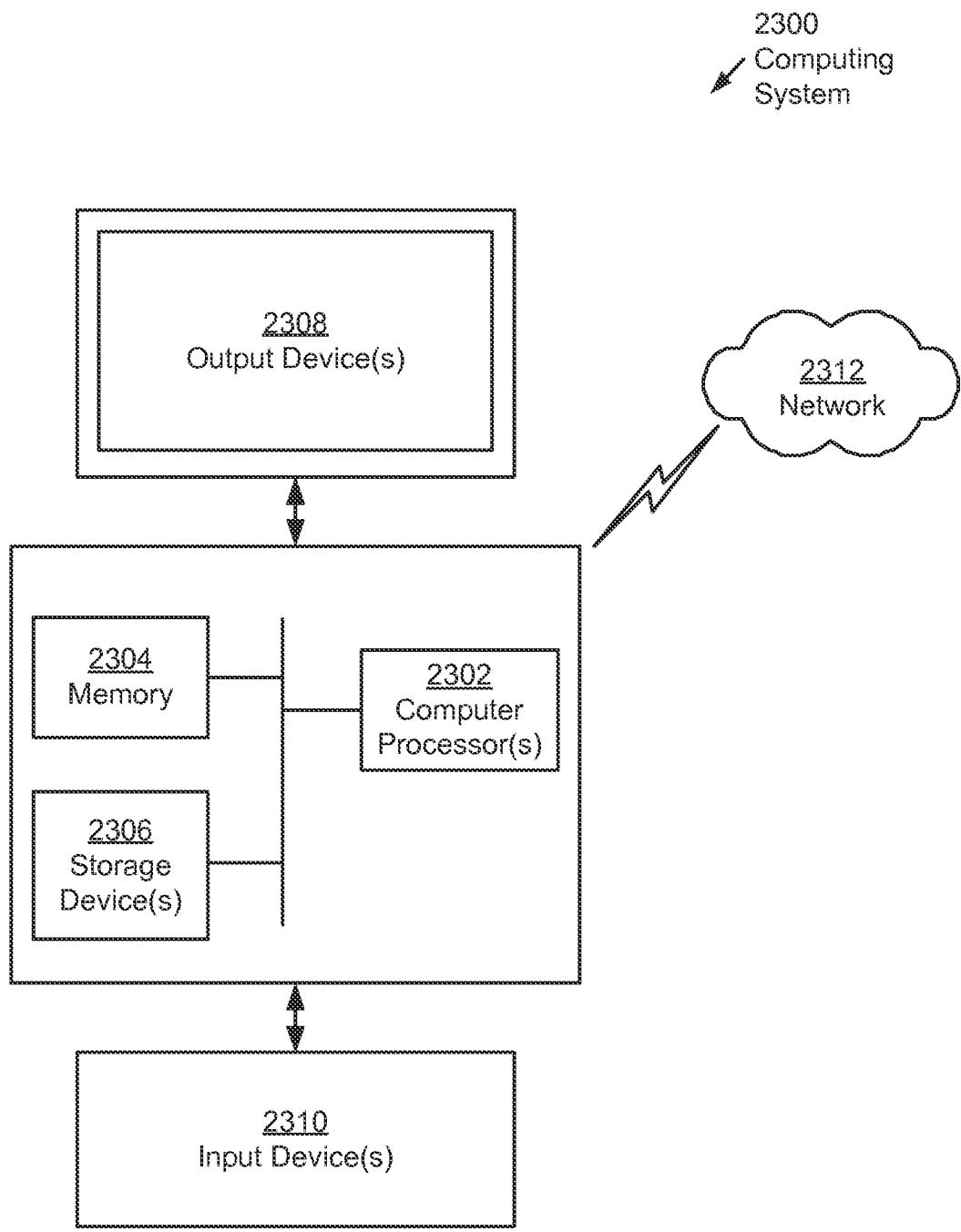
FIG. 23 shows a computing system in accordance with one or more embodiments.

Embodiments of the invention may be implemented on a computing system. Any combination of mobile, desktop, server, embedded, or other types of hardware may be used. For example, as shown in FIG. 23, the computing system (2300) may include one or more computer processor(s) (2302), associated memory (2304) (e.g., random access memory (RAM), cache memory, flash memory, etc.), one or more storage device(s) (2306) (e.g., a hard disk, an optical drive such as a compact disk (CD) drive or digital versatile disk (DVD) drive, a flash memory stick, etc.), and numerous other elements and functionalities. The computer processor(s) (2302) may be an integrated circuit for processing instructions. For example, the computer processor(s) may be one or more cores, or micro-cores of a processor. The computing system (2300) may also include one or more input device(s) (2310), such as a touchscreen, keyboard, mouse, microphone, touchpad, electronic pen, or any other type of input device. Further, the computing system (2300) may include one or more output device(s) (2308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (2300) may be connected to a network (2312) (e.g., a local area network (LAN), a wide area network (WAN) such as the Internet, mobile network, or any other type of network) via a network interface connection (not shown). The input and output device(s) may be locally or remotely (e.g., via the network (2312)) connected to the computer processor(s) (2302), memory (2304), and storage device(s) (2306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (2300) may be located at a remote location and connected to the other elements over a network (2312). Further, embodiments of the invention may be implemented on a distributed system having a plurality of nodes, where each portion of the invention may be located on a different node within the distributed system. In one embodiment of the invention, the node corresponds to a distinct computing device. The node may correspond to a computer processor with associated physical memory. The node may correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited by the attached claims.

What is claimed is:

1. A method for managing oilfield operations comprising:
   obtaining a subsurface model comprising a fracture design model having a fracture property with an uncertain value;
   obtaining a set of representative values that represent uncertainty in the fracture property, wherein the set of representative values comprises a plurality of model parameter samples;
   solving an oilfield optimization problem with a control variable using the set of representative values of the fracture property to obtain a solution comprising an optimal value for the control variable with respect to an objective function, wherein solving the oilfield optimization problem comprises:
      for each of the plurality of model parameter samples, executing a fracture forecast model with a respective value of the control variable and a respective model parameter sample of the plurality of model parameter samples to obtain a respective objective function value of the objective function; and
      determining the optimal value for the control variable based on the respective objection function value obtained with each of the plurality of model parameter samples;
   generating an oilfield design based on the solution; and
   storing the oilfield design.

2. The method of claim 1, further comprising:
   obtaining a set of representative values for a reservoir property with an uncertain value, wherein solving the oilfield optimization problem comprises using the set of representative values for the reservoir property.

3. The method of claim 1, wherein obtaining the set of representative values for the fracture property comprises:
   obtaining a set of representative values representing uncertainty in a seismic velocity model;
   obtaining microseismic event data; and
   generating the set of representative values for the fracture property using the set of representative values for the seismic velocity model and the microseismic event data.

4. The method of claim 1, further comprising:
   performing an oilfield operation according to the oilfield design.

5. The method of claim 1, further comprising:
   obtaining, using a plurality of sensors located in an oilfield, oilfield data,
   wherein obtaining the subsurface model comprising generating the subsurface model using the oilfield data, and
   wherein obtaining the set of representative values representing the uncertainty in the fracture property comprises generating the set of representative values for the fracture property based on the oilfield data.

6. The method of claim 1, wherein solving the oilfield optimization problem comprises:

for the plurality of model parameter samples, generating a first plurality of objective function values by, for each of the plurality of model parameter samples:
  sampling the set of representative values for the fracture property to obtain a model parameter sample in the plurality of model parameter samples, and
  executing the fracture forecast model with a first control variable value and the model parameter sample to obtain a first objective function value in the first plurality of objective function values;
calculating a first mean of the first plurality of objective function values; and
calculating a first variance of the first plurality of objective function values.

7. The method of claim 6, further comprising:
determining, based on the first mean and the first variance, that the first control variable value is the optimal value for the control variable; and
setting the first control variable value in the solution based on the determining that the first control variable value is the optimal value.

8. The method of claim 6, further comprising:
determining, based on the first mean and the first variance, that the first control variable value is not the optimal value for the control variable;
selecting a second control variable value based on the determining that the first control variable value is not the optimal value;
for the plurality of model parameter samples, generating a second plurality of objective function values by, for each of the plurality of model parameter samples:
  sampling the set of representative values for the fracture property to obtain the model parameter sample in the plurality of model parameter samples, and
  executing the fracture forecast model with the second control variable value and the model parameter sample to obtain a second objective function value in the second plurality of objective function values;
calculating a second mean of the second plurality of objective function values; and
calculating a second variance of the second plurality of objective function values.

9. The method of claim 8, further comprising:
determining, based on the second mean and the second variance, that the second control variable value is the optimal value for the control variable; and
setting the second control variable value in the solution based on the determining that the second control variable value is the optimal value.

10. The method of claim 1, wherein the objective function comprises a utility function, a loss function, or a cost function of the oilfield optimization problem.

11. A system for oilfield management comprising:
a computer processor;
an oilfield design tool that, when executed on the computer processor:
  obtains a subsurface model comprising a fracture design model having a fracture property with an uncertain value;
  obtains a set of representative values that represent uncertainty in the fracture property; and
  generates an oilfield design based on a solution;
an oilfield simulator that, when executed on the computer processor:
  executes a fracture forecast model with a control variable value and a model parameter sample to obtain an objective function value in a plurality of objective function values; and
a solver that, when executed on the computer processor:
  solves an oilfield optimization problem with a control variable using the set of representative values for the fracture property to obtain the solution comprising an optimal value for the control variable with respect to an objective function, wherein solving the oilfield optimization problem comprises:
    for a plurality of model parameter samples, generating the plurality of objective function values by, for each of the plurality of model parameter samples:
      sampling the set of representative values for the fracture property to obtain a respective model parameter sample in the plurality of model parameter samples, and
      issuing a call to the oilfield simulator with the control variable value and the respective model parameter sample; and
    calculating a mean of the plurality of objective function values.

12. The system of claim 11, wherein obtaining the set of representative values for the fracture property comprises:
obtaining a set of representative values that represent uncertainty in a seismic velocity model;
obtaining microseismic event data; and
generating the set of representative values for the fracture property using the set of representative values for the seismic velocity model and the microseismic event data.

13. The system of claim 11, further comprising:
an equipment controller for:
  transmitting a control signal to perform an oilfield operation based on the oilfield design.

14. The system of claim 13, further comprising:
oilfield equipment for:
  receiving the control signal; and
  performing the oilfield operation.

15. The system of claim 11, further comprising:
a plurality of sensors located at an oilfield for:
  obtaining oilfield data,
  wherein obtaining the subsurface model comprises generating the subsurface model using the oilfield data, and
  wherein obtaining the set of representative values comprises generating the set of representative values based on the oilfield data.

16. The system of claim 11, further comprising:
a data repository configured to store a plurality of sets of representative values.

17. A non-transitory computer readable medium for managing oilfield operations comprising computer readable program code for:
obtaining a subsurface model comprising a fracture design model having an fracture property with an uncertain value;
obtaining a set of representative values that represent uncertainty in the fracture property, wherein the set of representative values comprises a plurality of model parameter samples;
solving an oilfield optimization problem with a control variable using the set of representative values of the fracture property to obtain a solution comprising an optimal value for the control variable with respect to an objective function, wherein solving the oilfield optimization problem comprises:

for each of the plurality of model parameter samples, executing a fracture forecast model with a respective value of the control variable and a respective model parameter sample of the plurality of model parameter samples to obtain a respective objective function value of the objective function; and determining the optimal value for the control variable based on the respective objection function value obtained with each of the plurality of model parameter samples;

generating an oilfield design based on the solution; and storing the oilfield design.

18. The non-transitory computer readable medium of claim 17, wherein obtaining the set of representative values for the fracture property comprises:

obtaining a set of representative values that represent uncertainty in a seismic velocity model;

obtaining microseismic event data; and generating the set of representative values for the fracture property using the set of representative values for the seismic velocity model and the microseismic event data.

19. The non-transitory computer readable medium of claim 17, wherein the plurality of model parameter samples comprises a plurality of model parameter samples, and wherein solving the oilfield optimization problem comprises:

for the plurality of model parameter samples, generating a first plurality of objective function values by, for each of the plurality of model parameter samples:

sampling the set of representative values for the fracture property to obtain a model parameter sample in the plurality of model parameter samples, and executing the fracture forecast model with a first control variable value and the model parameter sample to obtain a first objective function value in the first plurality of objective function values; and calculating a first mean of the first plurality of objective function values.

20. The non-transitory computer readable medium of claim 19, further comprising:

calculating a first variance of the first plurality of objective function values.

* * * * *